United States Patent
Zhang et al.

(10) Patent No.: US 12,366,998 B2
(45) Date of Patent: Jul. 22, 2025

(54) CXL MEMORY MODULE AND CONTROLLER, METHOD FOR ACCESSING DATA, AND STORAGE SYSTEM

(71) Applicant: BEIJING SUPERSTRING ACADEMY OF MEMORY TECHNOLOGY, Beijing (CN)

(72) Inventors: Kai Zhang, Beijing (CN); Jin Dai, Beijing (CN); Yunsen Zhang, Beijing (CN)

(73) Assignee: BEIJING SUPERSTRING ACADEMY OF MEMORY TECHNOLOGY, Beijing (CN)

( * ) Notice: Subject to any disclaimer, the term of this patent is extended or adjusted under 35 U.S.C. 154(b) by 0 days.

(21) Appl. No.: 18/754,323

(22) Filed: Jun. 26, 2024

(65) Prior Publication Data
US 2025/0110668 A1    Apr. 3, 2025

Related U.S. Application Data

(63) Continuation of application No. PCT/CN2024/086865, filed on Apr. 9, 2024.

(30) Foreign Application Priority Data

Sep. 28, 2023  (CN) .......................... 202311264078.X

(51) Int. Cl.
*G06F 12/00* (2006.01)
*G06F 3/06* (2006.01)

(52) U.S. Cl.
CPC .......... *G06F 3/0659* (2013.01); *G06F 3/0608* (2013.01); *G06F 3/0631* (2013.01); *G06F 3/0656* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 9,727,629 B2 * | 8/2017 | Shoolman | H03M 7/707 |
| 2022/0114095 A1 * | 4/2022 | Nayak | G06F 12/10 |
| 2023/0049329 A1 | 2/2023 | Ki et al. | |

FOREIGN PATENT DOCUMENTS

| | | |
|---|---|---|
| CN | 103902467 A | 7/2014 |
| CN | 114115699 A | 3/2022 |
| CN | 116560562 A | 8/2023 |
| WO | 2022156650 A1 | 7/2022 |

OTHER PUBLICATIONS

CNIPA First Office Action in CN Application No. 202311264078X dated Nov. 9, 2023 (14 pages, including English translation).
CNIPA Notice of Allowance in CN Application No. 202311264078X dated Dec. 1, 2023 (9 pages, including English translation).

* cited by examiner

*Primary Examiner* — Daniel D Tsui
(74) *Attorney, Agent, or Firm* — BROOKS KUSHMAN P.C.

(57) ABSTRACT

A CXL memory module, a controller, a method for accessing data, and a storage system are provided, which relate to data storage technologies. The CXL memory module includes a controller and a group of memory chips connected to the controller. The controller has a KV interface based on a CXL protocol. The controller is configured to receive a KV instruction sent by an external device through the KV interface, store object-based data into a memory chip or acquire object-based data from a memory chip.

26 Claims, 5 Drawing Sheets

100, Receive a KV instruction sent by an external device through the KV interface 105, Store object-based data in a memory chip or acquiring object-based data from a memory chip

CXL MEMORY MODULE AND CONTROLLER, METHOD FOR ACCESSING DATA, AND STORAGE SYSTEM

CROSS-REFERENCE TO RELATED APPLICATIONS

This application is a continuation of International PCT Application. No. PCT/CN2024/086865 filed on Apr. 9, 2024, which claims priority to Chinese Patent Application No. 202311264078.X filed on Sep. 28, 2023, the disclosures of which are hereby incorporated herein by reference in their entireties.

TECHNICAL FIELD

The present disclosure relates to, but is not limited to, data storage technologies, in particular to a CXL memory module and a controller, a method for accessing data, and a storage system.

BACKGROUND

CXL (Compute Express Link) protocol is a memory interface protocol based on PCIe (Peripheral Component Interconnect Express) physical layer. The CXL interface is an interface between a Host and a storage device based on a PCIe link. The CXL interface may be used as an efficient interconnection mode to connect a Host CPU and an NVMe SSD (Non-Volatile Memory Express Solid State Drive) to achieve fast data transmission and low-latency access.

SUMMARY

The following is a summary of the subject matters described in detail in this document. This summary is not intended to limit the scope of protection of the claims.

An embodiment of the present disclosure provides a CXL memory module, including a controller and a group of memory chips connected to the controller. The controller has a KV (Key-Value pair) interface based on a CXL protocol, and is configured to receive a KV instruction sent by an external device through the KV interface, store object-based data into a memory chip or acquire object-based data from a memory chip.

An embodiment of the present disclosure further provides a controller in a CXL memory module, including a processor, a buffer, a CXL interface and a memory interface. A KV interface based on a CXL protocol is constructed above the CXL interface. The processor is configured to perform the following data putting operations: receiving a data putting request sent by an external device through the KV interface, the data putting request carrying an identification of a first object and information of data of the first object; buffering the data of the first object in the buffer, allocating a memory address to the first object, and storing the data of the first object into a memory chip connected to the memory interface according to the memory address; and updating an address mapping table to record a correspondence between the identification of the first object and the memory address.

An embodiment of the present disclosure further provides a method for accessing data, which is applied to a CXL memory module. The CXL memory module includes a controller and a group of memory chips connected to the controller, the controller has a KV interface based on a CXL protocol, the method includes: receiving a KV instruction sent by an external device through the KV interface, storing object-based data into a memory chip or acquiring object-based data from a memory chip.

An embodiment of the present disclosure further provides a storage system, including a host and a CXL memory module according to any embodiment of the present disclosure. The host communicates with the CXL memory module through a CXL interface to implement discovery, configuration and data transmission of the CXL memory module, and communicates with the CXL memory module through a KV interface constructed based on a CXL protocol to realize object-based data access between the host and the CXL memory module.

Other features and advantages of the present disclosure will be set forth in the following specification, and moreover, partially become apparent from the specification, or are understood by implementing the present disclosure. Other advantages of the present disclosure may be achieved and obtained by schemes described in the description and the drawings.

Other aspects may be understood upon reading and understanding the drawings and detailed description.

BRIEF DESCRIPTION OF THE DRAWINGS

Accompanying drawings are used for providing understanding of technical solutions of the present disclosure, and form a part of the specification. They are used for explaining the technical solutions of the present disclosure together with the embodiments of the present disclosure, but do not form a limitation on the technical solutions of the present disclosure.

DETAILED DESCRIPTION

Figure 1:
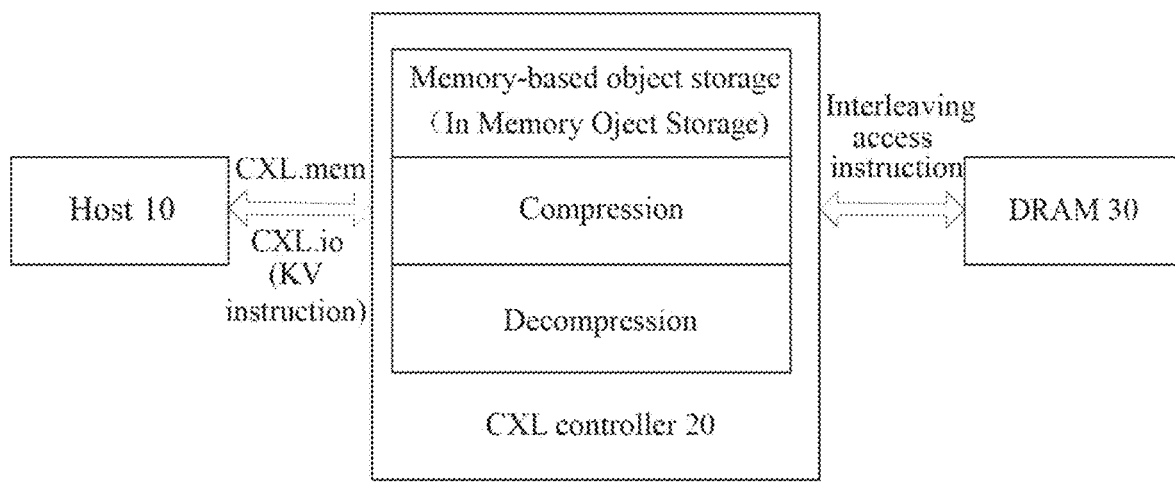
FIG. 1 is a schematic diagram of KV storing implemented based on a CXL memory module according to an embodiment of the present disclosure.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Embodiments of the present disclosure will be described in detail with reference to the accompanying drawings. The embodiments in the present disclosure and the features in the embodiments may be combined with each other arbitrarily if there is no conflict.

Multiple embodiments are described herein, but the description is exemplary rather than restrictive, and to those of ordinary skills in the art, there may be more embodiments and implementation solutions within the scope contained in the embodiments described herein. Although many possible combinations of features are shown in the accompanying drawings and discussed in specific implementations, many other combinations of the disclosed features are also possible. Unless expressly limited, any feature or element of any embodiment may be used in combination with, or may replace, any other feature or element in any other embodiment.

The present disclosure includes and contemplates combinations with features and elements known to those of ordinary skills in the art. Embodiments, features, and elements already disclosed in the present application may also be combined with any conventional features or elements to form a scheme protected in the present disclosure. Any feature or element of any embodiment may also be combined with features or elements from other disclosed schemes to form a scheme protected by the present disclosure. Accordingly, it should be understood that any of the features shown and discussed in the present disclosure may be implemented alone or in any suitable combination. Accordingly, embodiments are not subject to limitations other than those made in accordance with the protected technical scheme and equivalent replacements thereof. In addition, various amendments and changes may be made within the protection scope of the protected technical scheme.

Moreover, when representative embodiments are described, the specification may have presented a method and a process as a particular order of acts. However, to an extent that the method or process does not depend on a specific order of the acts in present disclosure, the method or process should not be limited to the acts in the specific order. As will be understood by those of ordinary skills in the art, other orders of acts may also be possible. Therefore, the specific order of acts set forth in the specification should not be construed as a limitation on the technical scheme protected by the present disclosure. In addition, the technical scheme with respect to the method and process should not be limited to executing their acts according to the written order. Those skilled in the art may easily understand that these orders may change, and are still in the essence and scope of the embodiments of the disclosure.

In the era of big data, the size of unstructured data is growing explosively. KV storing is a key-value pair based data storage mode, which is suitable for storing unstructured data. KV represents a data item consisting of a unique key and an associated value. The key is typically used to identify a specific data item, while the value includes actual data associated with the key. For example, the key may be a user's username, and the associated value may be the user's password, email address, or other related information. In the present disclosure, the "key" in the key-value pair is referred to as an identification of an object, and the "value" in the key-value pair is referred to as data of the object. A KV instruction that may be used by a KV storing interface (KV interface for short) includes instructions such as Put, Get, and Delete. The Put instruction is also called a data putting request in the present disclosure, and the Get instruction is also called a data getting request in the present disclosure. Both the data putting request and the data getting request include an identification of an object (that is, a specified key value). The KV instruction further includes an instruction responding to the data putting request (referred to as a data putting response in the present disclosure) and an instruction responding to the data getting request (referred to as a data getting response in the present disclosure). In addition to the above basic instructions, different KV storing systems may use some other KV instructions.

Currently, KV-based memory applications, such as Redis, do not access data based on the identification of the object, but through Byte Addressing. When CPU reads object data from a memory or writes object data to a memory, it operates with a Cacheline as a basic unit. Cacheline is a byte array with a fixed length, and its data size is usually 64 bytes or 128 bytes. When this mode of accessing data is used to access data of a larger object, such as an object with a data size much larger than 1 page size (data size of a flash memory page), the memory needs to be accessed repeatedly for several times, which increases instruction interaction and is inefficient. On the other hand, when data is stored into the memory, data is not compressed, or is compressed in a transparent compression mode outside a MC (memory Controller), mapping between an address and the compressed data is maintained through software, which is inefficient.

Therefore, an embodiment of the present disclosure provides a KV storing method based on a CXL memory module and a corresponding device. The efficiency of data access may also be improved by using a KV-based hardware compression/decompression mechanism and an interleaving access mode. The embodiment of the present disclosure may be applied to applications related to KV-based memory access.

An embodiment of the present disclosure provides a CXL memory module, including a controller and a group of memory chips connected to the controller. The controller has a KV interface based on a CXL protocol, and is configured to receive a KV instruction sent by an external device through the KV interface, store object-based data into a memory chip or acquire object-based data from a memory chip.

According to the embodiment of the present disclosure, the controller of the CXL memory module is provided with the KV interface based on the CXL protocol, KV-based data access operation is realized between the external device and the CXL memory module, and data (V value) of a corresponding object may be accessed (put or got) by carrying an identification of the object (K value) in the instruction, thus enriching the data access modes between the external device and the CXL memory module. Compared with the data access mode with Cacheline as a unit, the data of the object is accessed between the controller and the memory chips as a whole, which can improve storage efficiency. The external device in the present embodiment may be a local host, a remote host or other processor capable of initiating data access, connected to the CXL memory module. The present disclosure is not limited thereto.

In an exemplary embodiment of the present disclosure, the act of the controller storing the object-based data into the memory chip includes: acquiring original data of an object; compressing the original data of the object to obtain compressed data of the object; and writing the compressed data of the object to the memory chip. The act of the controller acquiring the object-based data from the memory chip includes: reading out compressed data of an object stored in the memory chip; and decompressing the compressed data of the object to obtain original data of the object and transmit the original data of the object to outside. In the present embodiment, data compression can reduce the occupation of storage space and speed up storage.

FIG. 1 is a schematic diagram of KV storing implemented based on a CXL memory module according to an embodiment of the present disclosure. The illustrated storage system includes a host 10 and a CXL memory module. The CXL memory module includes a CXL controller 20 and a memory chip (i.e., DRAM chip 30 in the figure) connected thereto. The CXL controller is simply referred to as a controller in the present disclosure, and may also be referred to as a CXL Memory Controller. The CXL controller 20 may be physically implemented with a CXL chip, but is not limited thereto. The CXL controller 20 is configured to manage one or more memory chips connected thereto. For example, the CXL controller 20 may access the memory chip(s) through an Interleaving Access instruction. The DRAM chip 30 is shown in the figure as an example of the memory chip, but the present disclosure is not limited thereto. The memory chip may also be other types of memory chips, such as SRAM (Static Random Access Memory), Flash memory, Non-Volatile Random Access Memory (NVRAM), and the like. The CXL controller 20 and the memory chip may be separated, and the two may be connected through various types of interfaces such as a PCIe interface. The CXL controller 20 and the memory chip may also be integrated together, such as integrated on a PCB board, or integrated on a chip.

When the CXL controller 20 is started, it establishes a communication link with the DRAM chip 30 connected thereto and initializes the DRAM chip 30. In a normal operating state, the CXL controller 20 may receive a KV instruction (such as a data putting request or a data getting request) from an external device (such as a host or other devices) and convert it into a corresponding memory access operation. In order to improve memory access efficiency and performance, the CXL controller 20 may buffer and pre-get data in the DRAM chip 30 to reduce memory access latency and improve bandwidth utilization.

As shown in FIG. 1, the host 10 (such as a CPU) may be connected to the CXL controller 20 via a CXL interface, and interact with the CXL controller 20 of the CXL memory module based on a CXL input-output (CXL. io) protocol and a CXL memory protocol (CXL. mem). In the present embodiment, a KV interface based on the CXL.io protocol is further constructed between the host 10 and the CXL controller 20 to enable the host 10 to interact with the CXL controller 20 based on a KV instruction to implement object-based memory reading and writing. For data access of a larger object (for example, a data size thereof is larger than that of one flash memory page (4 KB/16 KB)), a quantity of instructions used by the host 10 to access the CXL memory module is less than a quantity of instructions used by using the byte addressing mode, thereby reducing system latency and improving storage efficiency. In addition, when storing data, the CXL controller 20 may compress the data of the object and then store the compressed data into the DRAM chip 30 of the CXL memory module. When getting data, the CXL controller 20 reads out the compressed data of the object from the DRAM chip 30, decompresses it and then outputs the decompressed data. Compared with original data of the object, the compressed data of the object requires less access time and occupies less storage space, so that the efficiency of data storage can be improved.

Figure 6:
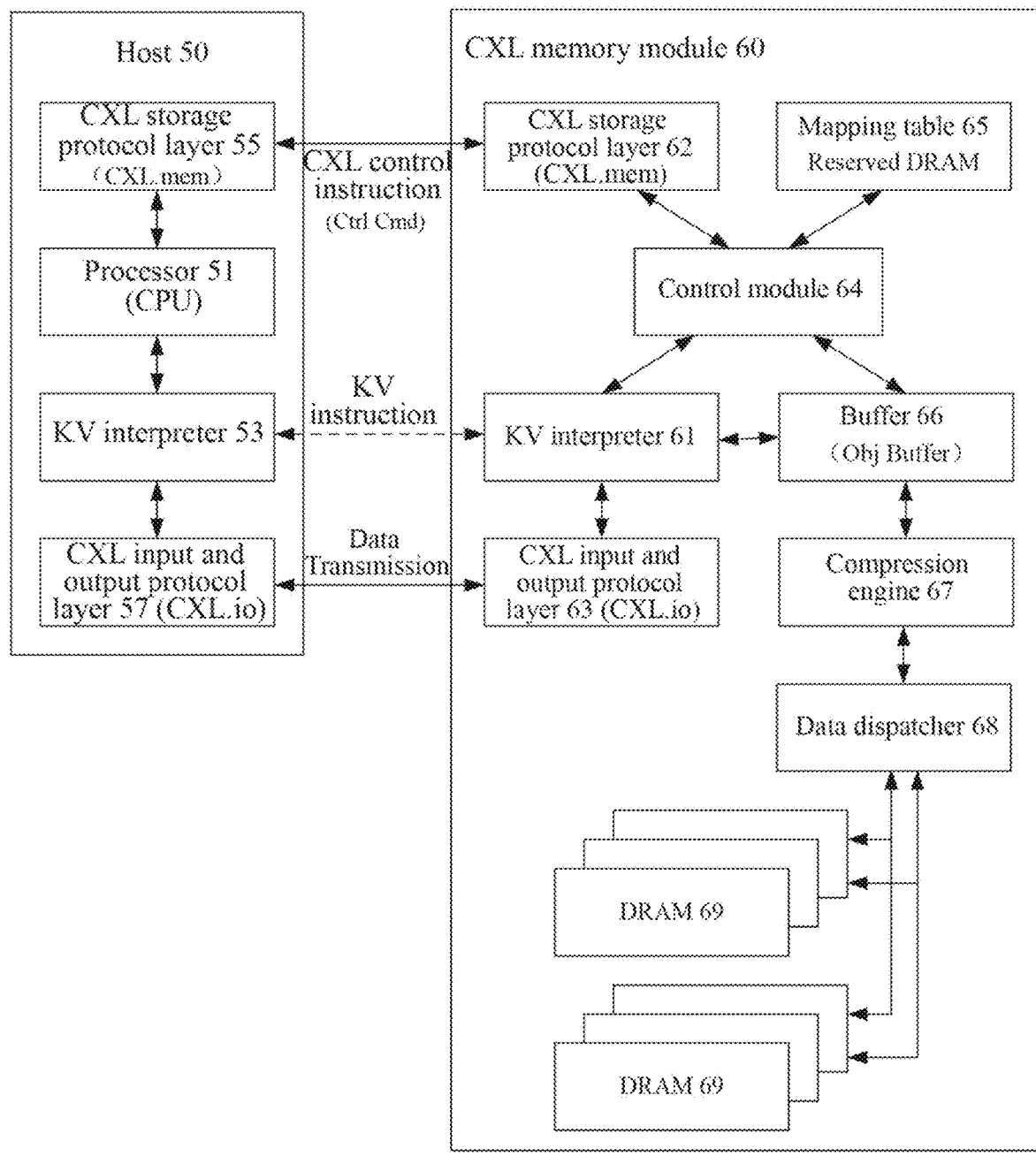
FIG. 6 is a module diagram of implementing KV storing based on a CXL memory module according to an embodiment of the present disclosure.

In an example of the present embodiment, referring to FIG. 6, the KV interface based on the CXL protocol may be implemented through a KV interpreter 61 constructed on a CXL.io protocol layer (i.e., a CXL storage protocol layer) 62. Referring to FIG. 3, the KV interpreter 61 is configured to extract a KV request encapsulated in a CXL.io instruction as data to be transmitted and parse the KV request, and encapsulate a KV response as data to be transmitted into the CXL.io instruction and send it. In another example, the KV interface based on the CXL protocol may be implemented by a KV interpreter constructed on a CXL.mem protocol layer. The KV interpreter is configured to extract a KV request encapsulated in a CXL.mem instruction as data to be transmitted and parse the KV request, encapsulate a KV response as data to be transmitted into the CXL.mem instruction and send it. The KV request includes a data putting request and a data getting request, and the KV response includes a data putting response and a data getting response. When the KV interpreter is constructed on the CXL.mem protocol layer, if a KV instruction will be transmitted through the CXL.mem instruction as data to be transmitted, the CXL.io instruction may be used to assist the transmission, such as indicating start and end of data transmission.

In an exemplary embodiment of the present disclosure, the act of the controller receiving the KV instruction sent by the external device through the KV interface, and storing the object-based data into the memory chip includes: receiving a data putting request sent by the external device through the KV interface, the data putting request carrying an identification of a first object and information of data of the first object; buffering the data of the first object, allocating a memory address to the first object, and writing the data of the first object to the memory chip according to the memory address; and updating an address mapping table to record a correspondence between the identification of the first object and the memory address.

In the present disclosure, the "first object" may be any object whose data needs to be stored in memory, but does not represent a special object, and may be used to distinguish it from other objects whose data are stored at the same time. The above-mentioned "external device" may be any device with memory reading and writing requirements, such as host, graphics card, network adapter, embedded system, and the like. In addition to a DRAM chip, the above-mentioned "memory chip" may also be other types of memory chips, such as SRAM, FRAM (Ferroelectric Random Access Memory), MRAM (Magnetoresistive Random Access Memory), and the like. The "object-based data" refers to an address of V or V in the KV, and a putting instruction and a getting instruction include K in the KV, i.e., an identification of an object.

In an exemplary embodiment of the present disclosure, the act of the controller receiving the KV instruction sent by the external device through the KV interface, and acquiring the object-based data from the memory chip includes: receiving a data getting request sent by the external device through the KV interface, the data getting request carrying the identification of the first object; finding the memory address corresponding to the identification of the first object from the address mapping table, and reading out the data of the first object from the memory chip according to the memory address; and transmitting the data of the first object to outside.

In the CXL memory module of the embodiment of the present disclosure, a KV interface (also known as a KV storage interface) based on a CXL protocol is constructed on the original CXL interface. The controller may receive the KV instruction sent by the external device through the KV interface. If a data putting request is received, data of the object is buffered and a memory address is allocated thereto. According to the memory address, the data of the object is stored in the memory chip, and a correspondence between the identification of the object and the memory address allocated to the object is recorded, which is convenient to read out the stored data according to the identification of the object. If the data getting request is received, the memory address corresponding to the identification of the object is searched out, and the data of the object is read out from the memory chip, and is buffered and then output. The CXL memory module of the embodiment realizes data access based on KV, and an external device (such as a host) can access the CXL memory module to carry out the object access operation of unstructured data. The data size accessed at one time is not limited by the data size of Cacheline. Data access of one or more objects only requires sending a request instruction and receiving a response instruction. Therefore, the number of instructions required for access can be reduced, and the data storage efficiency can be improved.

In some techniques, data is stored in memory without being compressed. In some other techniques, data is compressed outside the storage controller, making the overall storage system efficiency less. In the embodiment of the present disclosure, for the KV object, the CXL memory module may complete data compression before the data of the object is stored, and when the data of the object is read, the data is decompressed and then is output, that is, transparent compression is completed in the CXL memory module. After the data is compressed, the data size becomes smaller, the storage space occupied is smaller, and the writing speed is fast. Moreover, the external software does not need to maintain the mapping of the compressed data and the address, and will not bring a burden to the external device, which is beneficial to improving the overall efficiency of the storage system.

In an embodiment in which the data of the object is compressed and decompressed, in order to be distinguished from the data of the first object after compression (i.e., compressed data of the first object), the data of the first object after buffered but not compressed is referred to as original data of the first object. A buffer zone in the buffer for buffering the data to be written to the memory chip is referred to as a first buffer zone, and a buffer zone in the buffer for buffering the data read out from the memory chip is referred to as a second buffer zone. The data of the object read by the controller of the CXL memory module from a source address and the data of the object parsed from the data putting request before compression is performed are both called original data of the object. The original data may be data processed by an external device such as a host.

In an exemplary embodiment of the present disclosure, the act of the controller buffering the data of the first object includes: buffering original data of the first object in a first buffer zone. The controller is further configured to compress the original data of the first object using the following multi-object compression mode when determining that the original data of the first object that has been buffered is the data to be compressed: determining whether a total size of the buffered data to be compressed in the first buffer zone is greater than or equal to a set first threshold value; when the total size of the buffered data to be compressed is greater than or equal to the first threshold value, recording an offset of original data of each object in the buffered data to be compressed, compressing the buffered data to be compressed, and obtaining compressed data to be stored; and when the total size of the buffered data to be compressed is less than the first threshold value, and then the total size of the buffered data to be compressed is greater than or equal to the first threshold value due to adding of original data of a new object, recording an offset of original data of each object in the buffered data to be compressed, compressing the buffered data to be compressed, and obtaining compressed data to be stored.

In an example of the present embodiment, if there are three objects in the buffered data to be compressed, a data size of original data of a first object is 1 KB, a data size of original data of a second object is 3 KB, and a data size of original data of a third object is 7 KB, an offset of the original data of the first object is 0, an offset of the original data of the second object is 1 KB, and an offset of the original data of the third object is 4 KB.

In an example of the present embodiment, the first threshold value may be determined according to a size of the first buffer zone. For example, the first threshold value is not less than 4 KB, 8 KB, 16 KB, 32 KB, 64 KB, 128 KB, or 256 KB. When the first threshold value is determined according to a size of the first buffer zone, the larger the space of the first buffer zone, the larger the first threshold value may be set accordingly, but it needs to be smaller than the size of the first buffer zone. The larger the first threshold value is set, the more data is compressed at one time, which will improve the compression efficiency.

The CXL memory module of the present embodiment supports a multi-object compression mode. Under the multi-object compression mode, when a total size of original data of multiple objects that has been buffered reaches the first threshold value, the original data of multiple objects that has been buffered may be compressed as a whole to obtain compressed data to be stored. However, in the multi-object compression mode, original data of multiple objects does not have to be compressed together, and compression of original data of a single object is also allowed. For example, when the data size of the original data of a single object is greater than or equal to the first threshold value and smaller than the size of the first buffer zone, the original data of the object is compressed separately even if the multi-object compression mode is adopted. When the data size of the original data of the object is greater than or equal to the size of the first buffer zone, the original data of the object may be compressed several times in batches.

In an example of the present embodiment, a multi-object compression mode is adopted for all objects. The buffered data to be compressed includes the original data of all the objects that has been buffered, and the controller directly determines the original data of the first object that has been buffered as the data to be compressed, that is, the original data of all the objects to be written to the memory chip in the present example needs to be compressed. In another example of the present embodiment, the multi-object compression mode is adopted only for a designated object. In this case, the buffered data to be compressed only includes original data of a designated object that has been buffered, and the controller determines the original data of the first object that has been buffered as the data to be compressed only when the first object is the designated object. The designated object is an object whose original data has a data size greater than or equal to a set second threshold value, and the second threshold value is smaller than the first threshold value.

The multi-object compression mode may be illustrated by following specific examples.

In an example, the controller needs to compress data of all objects regardless of the data sizes of objects, and the buffered data to be compressed includes original data of all objects that has been buffered. It is assumed that the data size of the original data of the first object is 4 KB, the data size of the original data of the second object previously buffered in the first buffer zone is 12 KB, and the first threshold value is 16 KB. Since the original data of all objects are data to be compressed, after the original data of the first object is buffered, a total size of the buffered data to be compressed in the first buffer zone has reached 16 KB, which is equal to the first threshold value. Then, the offset of the original data of the first object in the buffered data to be compressed is recorded to be 12 KB. The offset of the original data of the second object in the buffered data to be compressed is 0 KB. The buffered data to be compressed of 16 KB are compressed as a whole to obtain compressed data to be stored. Assuming that a compression ratio is 50%, there are compressed data to be stored of 8 KB. When the controller acquires data, no matter the data of the first object or the second object, the compressed data to be stored is acquired first, decompression is performed to obtain the buffered data to be compressed, and then the original data of the first object or the second object is acquired according to the offset.

In another example, when the first threshold value is 32 KB, and other conditions are the same as in the previous example, after the original data of the first object is buffered in the first buffer zone, the total size of the buffered data to be compressed is 16 KB, which is smaller than the first threshold value, then data of a new object is waited to be added. When data of a new object is added to enable the total size of the buffered data to be compressed in the first buffer zone to be greater than or equal to 32 KB, then an offset of original data of each object in the buffered data to be compressed is recorded, and the buffered data to be compressed is compressed as a whole.

In yet another example, only original data of a designated object is compressed, for example, an object is a designated object only when its data size is greater than or equal to 1 KB. It is still assumed that the data size of the original data of the first object is 4 KB, the original data of the second object of 11.5 KB and the original data of the third object of 0.5 KB are previously buffered in the first buffer zone, and the first threshold value is 16 KB. Then, although the total size of the buffered data reaches the first threshold value of 16 KB, the original data of the third object is less than 1 KB and the third object is not a designated object. Thus, the buffered data to be compressed is only 15.5 KB. It is needed to continue waiting for the data of a new object to be added to enable the total size of the buffered data to be compressed in the first buffer zone to reach 16 KB, then an offset of original data of each object in the buffered data to be compressed is recorded, and the buffered data to be compressed is compressed as a whole. It should be noted that the designated object and the non-designated object may be stored in partitions in the first buffer zone, and the total size of the original data of the designated objects that has been buffered is counted in real time. In this example, the buffered data includes the original data of the designated objects and the original data of the non-designated object, while the buffered data to be compressed only includes the original data of the designated objects.

In the present embodiment, the controller compresses the original data of one or more objects included in the buffered data to be compressed after the buffered data to be compressed reaches the set first threshold value, so as to make full use of the buffer space and improve the compression effect. The setting of the first threshold value makes the compressed data to be stored after each compression not too small. When stored in the memory, the data may be striped into a plurality of data blocks, and stored in the memory chip in parallel and interleaved manner, so as to make full use of a channel between the controller and the memory chip, and more data are stored at one time, which realizes the effect of reducing the access times of the storage medium and improving the system efficiency.

In one example of the embodiment, in a case where the original data of the first object is compressed in the multi-object compression mode, the act of the controller allocating the memory address to the first object, and writing the data of the first object to the memory chip according to the memory address, may include: striping the compressed data to be stored into a plurality of data blocks, the compressed data of the first object being located in at least one of the plurality of data blocks; allocating memory addresses of different banks in a same interleave region to different data blocks in the plurality of data blocks, and taking the memory addresses allocated to the plurality of data blocks as memory addresses uniformly allocated to all objects to which the compressed data to be stored belongs; and writing the plurality of data blocks to respective corresponding banks in an interleaving access mode according to the memory addresses allocated to the plurality of data blocks, wherein one interleave region includes one or more banks in a flash memory chip.

In the memory chip such as DRAM, an interleaving access mode may be used for internal data access. By the interleaving access mode, a consecutive memory address space of a flash memory chip is divided into a plurality of Interleave regions, and each interleave region includes a plurality of Banks. Interleaving access is to uniformly distribute data to a plurality of Banks, each bank stores a portion of the data, and the system may access the data of the plurality of banks in parallel, thereby improving the efficiency of memory access. For example, if a storage system has 4 banks, and a 2-way Interleaving mode is adopted, the memory address space is divided into two Interleave regions, and each Interleave region includes 2 banks. The system may access a plurality of banks in the same Interleave region at the same time. An embodiment of the present disclosure extends the Interleaving mode to a plurality of flash memory chips, and one Interleave region may include banks in the plurality of flash memory chips, so as to simultaneously utilize the parallel reading and writing capabilities of a plurality of DRAM chips to improve storage performance and throughput.

In order to use the Interleaving mode to store the compressed data to be stored in a memory chip, it needs to stripe the compressed data to be stored first. The specific Striping operation may vary depending on storage architecture and algorithm. For example, when striping is performed, the data blocks are scattered and stored on as many available storage devices as possible to achieve better performance and load balancing. After the compressed data to be stored is striped into multiple consecutive data blocks (a size of the other data blocks except the last data block is equal to a set value), different banks may be selected for different data blocks by rotation selection, hash function or other algorithms, so as to reduce conflicts and improve concurrency performance as much as possible. In an example, the controller creates a consecutive memory address space for allocation based on a memory space of all memory chips connected thereto, and each memory address corresponds to an actual physical address (the physical address may be identified by a memory chip ID, bank ID, row ID, and column ID together). When memory addresses of different banks in the same interleaving region are allocated to different data blocks from the created memory address space, a first address may be allocated to a first data block, an offset value may be added based on the first address and allocated to a second data block, and two offset values may be added based on the first address and allocated to a third data block, and so on. Thus, the memory address allocated to each data block does not need to be recorded separately, and the memory addresses allocated to all data blocks may be obtained according to the memory address allocated to the first data block, the set offset value and an allocation order.

According to the multi-object compression mode supported by the present embodiment, data of a plurality of objects may be compressed together, and accordingly, a size of the striped data block may be set relatively large, so as to obtain higher access efficiency.

In an exemplary embodiment of the present disclosure, the controller may compress only the original data of the designated object, but does not compress the original data of the non-designated object. The controller is further configured to allocate a memory address to the first object and write the data of the first object to the memory chip according to the memory address in a following mode when the buffered data to be compressed only includes the original data of the designated object that has been buffered and the first object is not the designated object: directly allocating a memory address to the first object according to the original data of the first object without compressing the original data of the first object, and writing the original data of the first object to the memory chip according to the allocated memory address.

The present embodiment takes into account that when the data size of the object is small (for example, less than 1 KB), if the object is compressed together with other objects, the compressed data of all the objects compressed together (that is, the compressed data to be stored) needs to be read out and decompressed and buffered when data is acquired, which will reduce the efficiency of data getting. Therefore, the present embodiment divides objects into two types: designated objects and non-designated objects according to their sizes. For a designated object (larger object), its data is compressed using the multi-object compression mode and then is stored in the DRAM chip. For a non-designated object (smaller object), a memory address is allocated to the original data of the object, and the original data of the object is directly stored into the DRAM chip. In this way, when data of a non-designated object is acquired, the original data of the object may be read out from the DRAM chip according to the allocated memory address and buffered in a second buffer zone, and there is no need to read out the data of other unwanted objects, and there is no need to decompress the read-out data, so that the efficiency of data getting can be improved. At the same time, the smaller object itself occupies less storage space and requires less storage times, and direct storing to a DRAM chip has little impact on the efficiency of data storage. The present embodiment can improve the overall performance of the storage system by different processings of different objects.

In another exemplary embodiment of the present disclosure, the controller may only compress the original data of a designated object. For a non-designated object, it is further divided into two cases, one is to not compress, and the other is to compress using a single object compression mode. The controller of the present embodiment is further configured to allocate a memory address to the first object and write the data of the first object to the memory chip according to the memory address in the following manner when the buffered data to be compressed only includes the original data of the designated object that has been buffered and the first object is not the designated object: first determining whether a data size of the original data of the first object is greater than or equal to a set third threshold value, the third threshold value being smaller than the second threshold value; compressing the original data of the first object individually using a single object compression mode, allocating a memory address to the first object according to the compressed data of the first object, and writing the compressed data of the first object to the memory chip according to the allocated memory address when the data size of the original data of the first object is greater than or equal to the third threshold value; and not compressing the original data of the first object, allocating a memory address to the first object according to the original data of the first object, and writing the original data of the first object to the memory chip according to the allocated memory address when the data size of the original data of the first object is smaller than the third threshold value.

The present embodiment performs refinement processing on the basis of distinguishing the two types of objects. That is, when the first object is determined not to be a designated object, it is further divided into two situations for data storage processing. That is, the present embodiment divides the objects into three types according to the sizes of the original data of the objects:

For objects whose data sizes are smaller than the third threshold value (such as 32 bytes, 64 bytes, 128 bytes, and the like) (which may be called small objects), the original data is directly written to the memory chip without compression. When the original data of the object is not compressed, original data of one small object may be written at one time, and when the buffered data of the multiple small objects reaches a set fourth threshold value (the fourth threshold value is smaller than the second threshold value and greater than the third threshold value), original data of multiple small objects together may be stored to the memory chip.

For objects whose data size is greater than or equal to the third threshold value and smaller than the second threshold value (such as 512 byte, 1 KB, 2 KB, and the like) (objects of an intermediate size), a single object compression mode is adopted, that is, the original data of a single object is compressed and then stored in the memory chip. The compressed data of a single object may also be stored in the memory chip in an interleaving mode. For example, the compressed data of the object is first striped into a plurality of data blocks, and memory addresses in different banks in the same interleaving region are allocated to the plurality of data blocks. Then, based on the allocated addresses, the plurality of data blocks are stored in the memory chip in an interleaving mode in parallel.

For an object whose data size is greater than or equal to the second threshold value (called a large object), a multi-object compression mode is adopted. When the data size of the large object is smaller than the first threshold value (such as 4 KB, 8 KB, 16 KB, and the like), its original data are compressed together with the original data of other objects and then stored in the memory chip. When the original data of the large object is greater than or equal to the first threshold value, the original data of the large object may be compressed separately, which belongs to the case that requires separate compression under the multi-object compression mode.

In order to record the compression mode adopted by a certain object, metadata of the object may be searched to obtain the data size of the original data of the object, and the compression mode of the object may be determined according to the data size. A compression mode mark for each object may be added locally (such as a mapping table) to indicate the compression mode adopted by the object. The compression mode may include at least two of the following three modes: non-compression, a single object compression mode, and a multi-object compression mode.

In the present embodiment, a single object compression mode for objects of intermediate size is added, the size of compressed data becomes smaller when data is stored, the storage speed is faster and the space occupied is smaller, when data is acquired, the compressed data of the object may be acquired separately, and after decompression, buffered, without need of reading out the data of other objects. The present embodiment may distinguish processing modes for three different objects, and can further improve the overall performance of the storage system, for example, it can better balance the speed of data putting and data getting.

In another exemplary embodiment of the present disclosure, unlike the aforementioned embodiments, a multi-object compression mode is adopted for the designated object (larger object), and a single-object compression mode is adopted for all non-designated objects. Whether the object belongs to the designated object or the non-designated object may be determined by comparing the data size of the original data of the object with the set second threshold value.

In an exemplary embodiment of the present disclosure, information of the data of the first object may include a data size and a source address of the original data of the first object; and the act of the controller buffering the data of the first object includes: parsing the data putting request to obtain the data size and the source address, and reading the original data of the first object from outside according to the data size and the source address and buffering the original data of the first object in a first buffer zone. Alternatively, information of the data of the first object includes original data of the first object, and the act of the controller buffering the data of the first object includes: parsing the data putting request to obtain the original data of the first object, and buffering the original data of the first object in a first buffer zone.

That is to say, the data of the object to be stored in a memory may be directly carried in the data putting request, or the data of the object may be stored in an external memory (such as a cache or other memory used by the host). When the data of the object needs to be stored in the memory, the external device carries an external address where the data of the object is currently located as the source address in the data putting request that will be sent, and the CXL controller may read data from the source address and write the data into the first buffer zone.

The external device may choose which data transmission mode to be used according to a set threshold value of the data size. For example, when the data size of the object is smaller than the set threshold value of the data size, the data of the object may be directly carried in the data putting request. This transmission mode may simplify the operation, save bandwidth, and speed up the storage speed and reduce the latency in the scene with many small objects. When the data size of the object is greater than or equal to the set threshold value of the data size, the source address of the data may be carried in the data putting request. If the first buffer zone is capable of buffering all the data, the CXL controller may read all the data of the object from outside for one time and store it in the first buffer zone. If a space of the first buffer zone is insufficient, the data of the object may also be read for multiple times, and part of the data is read and buffered for each time. After this part of the data is written to the memory, the next reading is carried out.

In an exemplary embodiment of the present disclosure, the controller is further configured to extract metadata of the first object from the data putting request after receiving the data putting request sent by an external device, wherein the metadata of the first object includes an identification and a data size of the first object; and store the metadata of the first object to a memory space created for the metadata of the object in the memory chip through a memory interface. The metadata of the object may further include creation time, modification time, and the like of the object. The storage space created for the metadata of the object may be a space (or called reserved space) divided from the DRAM chip, and storage of the metadata may be optimized by building a linked list, using multi-level directories, and so on. Although the present embodiment stores the metadata of the object in the DRAM, the metadata of the object may also be stored in a buffer of the controller in some other embodiments. For example, the metadata of the object may be stored together with an address mapping table that needs to be updated when the data is stored, or separately stored in the buffer of the controller or in a space divided from the memory chip.

In an exemplary embodiment of the present disclosure, when the original data of the first object is compressed in the multi-object compression mode, the act of the controller receiving the KV instruction sent by the external device through the KV interface, and acquiring the object-based data from the memory chip includes: receiving a data getting request sent by the external device through the KV interface, the data getting request carrying an identification of the first object; searching an address mapping table according to the identification of the first object, and finding a memory address allocated to a plurality of data blocks into which the compressed data to be stored is striped; reading out the plurality of data blocks from the memory chip according to the memory address, splicing the plurality of data blocks into the compressed data to be stored, decompressing the compressed data to be stored, obtaining the buffered data to be compressed and buffering the buffered the data to be compressed in a second buffer zone; and extracting the original data of the first object from the buffered data to be compressed according to a data size of the original data of the first object and an offset of the original data of the first object in the buffered data to be compressed, and transmitting part or all of the original data of the first object to outside.

Taking a case where the first object is the designated object as an example, the compressed data to be stored may include compressed data of one or more objects. If the compressed data of a plurality of objects (including the first object) is included, the memory address where the compressed data of each object is located is not recorded. Instead, the memory addresses allocated to the plurality of data blocks into which the compressed data to be stored is striped are used as memory addresses uniformly allocated to the plurality of objects. When the correspondence between the identification of the first object and the memory address allocated to the first object is recorded in the address mapping table, a correspondence between the identification of the first object and the memory address uniformly allocated is also recorded. In this case, the identifications of the plurality of objects in the address mapping table correspond to the uniformly allocated memory addresses. When the data of any one of the plurality of objects is to be read, the memory address uniformly allocated may be found from the address mapping table according to the identification of the object. The plurality of data blocks are read out from the memory chip according to the memory address, and are spliced into the original compressed data to be stored in an original order. After the compressed data to be stored is decompressed, the original data of the plurality of objects arranged in the original order may be obtained, that is, the buffered data to be compressed including the original data of the first object when the data is stored, and the buffered data to be compressed is buffered in a second buffer zone. Then, according to the offset of the original data of the first object in the buffered data to be compressed and the data size of the original data of the object recorded when the data is stored, the original data of the object may be extracted from the buffered data to be compressed.

The data size of the original data of the first object may be obtained by parsing the data putting request. The second buffer zone and the first buffer zone respectively buffer data to be written and data to be read, and may be buffer zones in the same buffer or buffer zones in different buffers. A plurality of buffer zones belonging to the same buffer may be divided according to configuration information of the buffer. The buffer may adopt SRAM (Static Random Access Memory), but is not limited thereto.

In another exemplary embodiment of the present disclosure, when the original data of the first object is not compressed, the acting of the controller receiving the KV instruction sent by the external device through the KV interface, and acquiring the object-based data from the memory chip includes: receiving a data getting request sent by the external device through the KV interface, the data getting request carrying the identification of the first object; finding a memory address corresponding to the identification of the first object from the address mapping table, reading out the original data of the first object from the memory chip according to the found memory address, and buffering the original data of the first object in a second buffer zone; and transmitting part or all of the original data of the first object to outside.

In the present embodiment, for the object whose data is stored without being compressed, the original data of the object may be directly read out from the memory chip according to the memory address, and transmitted to outside after buffered.

In another exemplary embodiment of the present disclosure, when the original data of the first object is compressed in a single object compression mode, the act of the controller receiving the KV instruction sent by an external device through the KV interface, and acquiring the object-based data from the memory chip includes: receiving a data getting request sent by the external device through the KV interface, the data getting request carrying the identification of the first object; finding the memory address corresponding to the identification of the first object from the address mapping table, reading out compressed data of the first object from the memory chip according to the found memory address and buffering the compressed data of the first object in a second buffer zone; and decompressing the compressed data of the first object to obtain the original data of the first object, and transmitting part or all of the original data of the first object to outside.

In the present embodiment, for the object whose data is stored using a single object compression mode, the compressed data of the object may be read out from the memory chip according to the memory address and buffered, and be decompressed to obtain the original data of the object, and then the original data of the object is transmitted to outside.

In an exemplary embodiment of the present disclosure, the data getting request further carries data size information of the data to be acquired and offset information of the data to be acquired in the original data of the first object. The act of the controller transmitting part of the original data of the first object to outside includes: extracting the data to be acquired from the original data of the first object according to the data size information and the offset information, and transmitting the data to be acquired to outside. The present embodiment may support getting part of the data of the object, which is more flexible, and can improve the overall performance of the storage system.

In an exemplary embodiment of the present disclosure, the act of the controller transmitting part or all of the original data of the first object to outside includes: carrying the part or all of the original data of the first object in a data getting response and sending it to the external device. Alternatively, the data getting request further carries information of an external address for storing data to be acquired, that is, the external device specifies a storage space to which the acquired data is to be stored; and the act of the controller transmitting part or all of the original data of the first object to outside includes: writing the part or all of the original data of the first object to the storage space corresponding to the external address. In these two modes of transmitting the read data to the outside, the first mode (carrying the data in the data getting response) may use data response to achieve rapid transmission of small objects; and the second mode may support the transmission of larger data blocks.

The aforementioned embodiments of the present disclosure realize KV-based data access based on a CXL memory module, and may also utilize KV-based hardware compression/decompression mechanism and interleaving access mode to obtain better storage efficiency, which may be applied to applications related to KV-based memory access.

Figures 2, 3A:
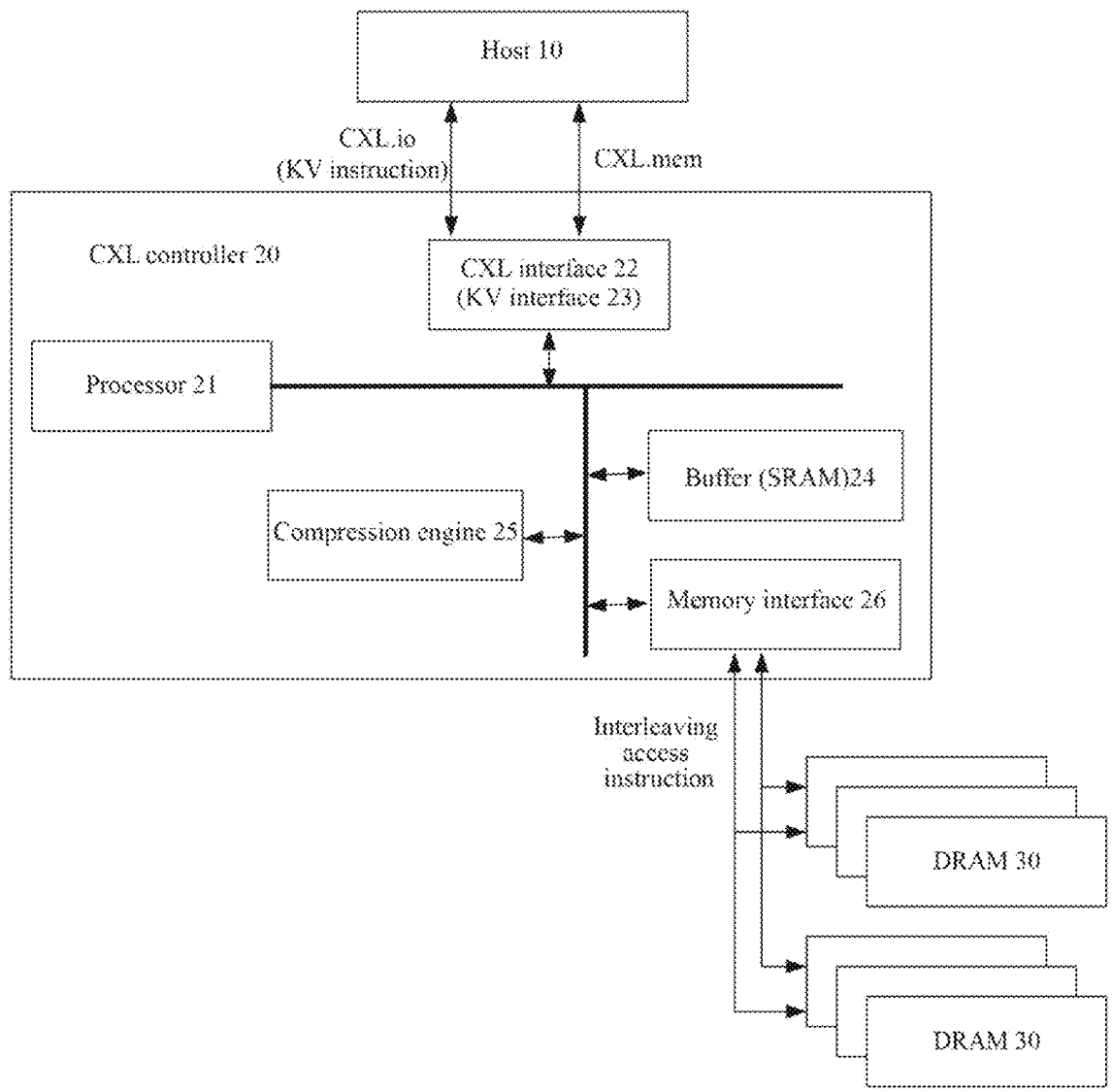
FIG. 2 is a hardware architecture diagram of KV storing implemented based on a CXL memory module according to an embodiment of the present disclosure.
FIG. 3A is a flowchart of a method for accessing data according to an embodiment of the present disclosure.

An embodiment of the present disclosure provides a controller in a CXL memory module, as shown in FIG. 2, including a processor 21, a buffer 24, a CXL interface 22, and a memory interface 26. A KV interface 23 based on a CXL protocol is constructed on the CXL interface. The processor 21 may be connected to each interface and the buffer via a bus. The processor 21 is configured to perform the following data putting operations: receiving a data putting request sent by an external device (such as a host 10) through the KV interface 23, the data putting request carrying an identification of a first object and information of data of the first object; buffering the data of the first object in the buffer 24, allocating a memory address to the first object, and storing the data of the first object in a memory chip 30 connected to the memory interface 26 according to the memory address; and updating an address mapping table to record a correspondence between the identification of the first object and the memory address.

After receiving the data putting request and buffering the data of the first object in the buffer 24, the processor 21 may return a data putting response to the external device without waiting for the data to be written to the memory chip.

The processor 21 in the controller 20 in the present embodiment may be a general-purpose processor, including a Central Processing Unit (CPU), a Network Processor (NP), a microprocessor, and the like, or may be other conventional processors. The processor may further be a digital signal processor (DSP), an application specific integrated circuit (ASIC), a field-programmable gate array (FPGA), a discrete logic or another programmable logic device, a discrete gate or transistor logic device, and a discrete hardware component; or may also be a combination of the above devices.

That is, the processor of the above embodiment may be any processor device or a combination of devices that implements the methods, acts, and logical block diagrams of the embodiments of the present disclosure. If embodiments of the present disclosure are partially implemented in software, instructions for the software may be stored in a suitable non-volatile computer-readable storage medium, and the instructions may be executed in hardware using one or more processors to implement the methods of embodiments of the present disclosure.

In an exemplary embodiment of the present disclosure, the processor 21 is further configured to perform the following data getting operations: receiving a data getting request sent by an external device through the KV interface 23, the data getting request carrying the identification of the first object; finding the memory address corresponding to the identification of the first object from the address mapping table, and reading out the data of the first object from the memory chip 30 according to the memory address; and transmitting the data of the first object to outside.

In an example of the present embodiment, referring to FIGS. 2 and 6, a KV interface based on the CXL protocol may be implemented by a KV interpreter 61 constructed on a CXL.io protocol layer 62. The KV interpreter 61 is configured to extract a KV request encapsulated in a CXL.io instruction and parse the KV request, and encapsulate a KV response into a CXL.io instruction to send. The KV request includes a data putting request and a data getting request, and the KV response includes a data putting response and a data getting response. In another example, the KV interface based on the CXL protocol may be implemented by a KV interpreter 61 constructed on the CXL.io protocol layer 62 and the CXL.mem protocol layer 62, or by a KV interpreter 61 constructed on the CXL.mem protocol layer 62. The KV interpreter 61 is configured to extract a KV request encapsulated in the CXL.mem instruction and parse the KV request, and encapsulate a KV response into a CXL.mem instruction to send. In the present embodiment, the KV request and the KV response may be encapsulated in a CXL.io instruction or a CXL.mem instruction as data to be transmitted. The CXL memory module and the KV interpreter 61 in the CPU may recognize a KV instruction according to a set data format of the KV instruction and parse the KV instruction.

Through KV storage, the present embodiment may adopt a mode of storing large blocks of data (for example, a data size greater than the data size of one flash memory page) to store data of an object, so as to make full use of the interleaving access mode of a plurality of memory chips and improve the system bandwidth.

In an exemplary embodiment of the present disclosure, the act of the processor buffering the data of the first object includes: buffering the original data of the first object in a first buffer zone of the buffer. The controller further includes a compression engine 25, and the processor is further configured to compress the original data of the first object by the compression engine using the following multi-object compression mode when determining that the original data of the first object that has been buffered is data to be compressed: determining whether a total size of the buffered data to be compressed in the first buffer zone is greater than or equal to a set first threshold value; and when the total size of the buffered data to be compressed is greater than or equal to the first threshold value, recording an offset of original data of each object in the buffered data to be compressed, compressing the buffered data to be compressed, and obtaining compressed data to be stored; and when the total size of the buffered data to be compressed is less than the first threshold value, and then the total size of the buffered data to be compressed is greater than or equal to the first threshold value due to adding of original data of a new object, recording an offset of original data of each object in the buffered data to be compressed, compressing the buffered data to be compressed, and obtaining compressed data to be stored.

In one example of the embodiment, when the original data of the first object is compressed in the multi-object compression mode, the act of the processor allocating the memory address to the first object, and storing the data of the first object into the memory chip connected to the memory interface according to the memory address includes: striping the compressed data to be stored into a plurality of data blocks, the compressed data of the first object being located in at least one of the plurality of data blocks; allocating memory addresses of different banks in a same interleave region to different data blocks in the plurality of data blocks, and taking the memory addresses allocated to the plurality of data blocks as memory addresses uniformly allocated to all objects to which the compressed data to be stored belongs; and writing the plurality of data blocks to respective corresponding banks in an interleaving access mode according to the memory addresses allocated to the plurality of data blocks, wherein one interleave region includes one or more banks in a flash memory chip.

In an example of the present embodiment, the first threshold value may be determined according to a size of the first buffer zone. The first threshold value is not less than 4 KB, 8 KB, 16 KB, 32 KB, 64 KB, 128 KB, or 256 KB.

In an example of the present embodiment, the buffered data to be compressed includes original data of all objects that has been buffered, and the processor directly determines the original data of the first object that has been buffered as data to be compressed. Alternatively, the buffered data to be compressed only includes the original data of a designated object that has been buffered, and the processor determines the original data of the first object that has been buffered as the data to be compressed only when the first object is a designated object. The designated object is an object whose original data has a data size greater than or equal to a set second threshold value, and the second threshold value is smaller than the first threshold value.

In an exemplary embodiment of the present disclosure, the processor is further configured to allocate a memory address to the first object and store the data of the first object into the memory chip connected to the memory interface according to the memory address in the following mode when the buffered data to be compressed only includes the original data of the designated object that has been buffered and the first object is not the designated object: directly allocating a memory address to the first object according to the original data of the first object without compressing the original data of the first object, and writing the original data of the first object to the memory chip according to the allocated memory address; or first determining whether a data size of the original data of the first object is greater than or equal to a set third threshold value, the third threshold value being smaller than the second threshold value; compressing the original data of the first object individually using a single object compression mode, allocating a memory address to the first object according to the compressed data of the first object, and writing the compressed data of the first object to the memory chip according to the allocated memory address when the data size of the original data of the first object is greater than or equal to the third threshold value; and not compressing the original data of the first object, allocating a memory address to the first object according to the original data of the first object, and writing the original data of the first object to the memory chip according to the allocated memory address when the data size of the original data of the first object is smaller than the third threshold value.

In an exemplary embodiment of the present disclosure, information of the data of the first object may include a data size and a source address of the original data of the first object; and the act of the controller buffering the data of the first object includes: parsing the data putting request to obtain the data size and the source address, and reading the original data of the first object from outside according to the data size and the source address and buffering the original data of the first object in a first buffer zone. Alternatively, information of the data of the first object includes original data of the first object; and the act of the processor buffering the data of the first object includes: parsing the data putting request to obtain the original data of the first object, and buffering the original data of the first object in a first buffer zone.

In an exemplary embodiment of the present disclosure, when the original data of the first object is compressed in the multi-object compression mode, the processor is further configured to perform the following data getting operations: receiving a data getting request sent by the external device through the KV interface, the data getting request carrying an identification of the first object; searching an address mapping table according to the identification of the first object, and finding memory addresses allocated to a plurality of data blocks into which the compressed data to be stored is striped; reading out the plurality of data blocks from the memory chip according to the memory addresses, splicing the plurality of data blocks into the compressed data to be stored, decompressing the compressed data to be stored, obtaining the buffered data to be compressed and buffering the buffered data to be compressed in a second buffer zone; and extracting the original data of the first object from the buffered data to be compressed according to a data size of the original data of the first object and an offset in the buffered data to be compressed, and transmitting part or all of the original data of the first object to outside.

In an exemplary embodiment of the present disclosure, when the original data of the first object is not compressed, the processor is further configured to perform the following data getting operations: receiving a data getting request sent by the external device through the KV interface, the data getting request carrying the identification of the first object; finding the memory address corresponding to the identification of the first object from the address mapping table, reading out the original data of the first object from the memory chip according to the found memory address, and buffering the original data of the first object in a second buffer zone; and transmitting part or all of the original data of the first object to outside.

In an exemplary embodiment of the present disclosure, when the original data of the first object is compressed in a single object compression mode, the processor is further configured to perform the following data getting operations: receiving a data getting request sent by the external device through the KV interface, the data getting request carrying the identification of the first object; finding the memory address corresponding to the identification of the first object from the address mapping table, reading out compressed data of the first object from the memory chip according to the found memory address and buffering the compressed data of the first object in a second buffer zone; and decompressing the compressed data of the first object to obtain the original data of the first object, and transmitting part or all of the original data of the first object to outside.

In an exemplary embodiment of the present disclosure, the data getting request further carries data size information of the data to be acquired and offset information of the data to be acquired in the original data of the first object. The act of the processor transmitting part of the original data of the first object to outside includes: extracting the data to be acquired from the original data of the first object according to the data size information and the offset information, and transmitting the data to be acquired to outside.

In an exemplary embodiment of the present disclosure, the act of the processor transmitting part or all of the original data of the first object to outside includes: carrying the part or all of the original data of the first object in a data getting response and sending it to the external device. Alternatively, the data getting request further carries information of an external address for storing the data to be acquired, and the act of the controller transmitting part or all of the original data of the first object to outside includes: writing the part or all of the original data of the first object to a storage space corresponding to the external address.

In an exemplary embodiment of the present disclosure, the processor is further configured to extract metadata of the first object from the data putting request after receiving the data putting request sent by an external device, the metadata of the first object including an identification and a data size of the first object; and store the metadata of the first object to a memory space created for the metadata of the object in the memory chip through a memory interface. The address mapping table may be stored with the metadata, but it may also be stored separately in the buffer of the controller or in a space divided from the memory chip.

The aforementioned embodiments of the present disclosure realize KV-based memory storing based on a CXL memory module, and may also utilize KV-based hardware compression/decompression mechanism and interleaving access mode to obtain better storage efficiency, which may be applied to applications related to KV-based memory access.

An embodiment of the present disclosure further provides a storage system, as shown in FIG. 1 and FIG. 2, including a host 10 and a CXL memory module described in any embodiment of the present disclosure. The CXL memory module includes a controller 20 and a memory chip (i.e., a DRAM chip 30). The host 10 communicates with the CXL memory module through a CXL interface to implement discovery, configuration and data transmission of the CXL memory module, and communicates with the CXL memory module through a KV interface constructed based on a CXL protocol to realize object-based data access between the host and the CXL memory module. Herein, the CXL interface may support the CXL.io protocol and the CXL.mem protocol. The discovery, configuration and data transmission of the CXL memory module may be realized through the CXL.io protocol, and the data transmission may also be realized through the CXL.mem protocol. The KV instruction may be encapsulated in the CXL.io instruction (or CXL.mem instruction) for transmission as the data to be transmitted. Thus, the host may communicate with the CXL memory module through the KV interface, so as to realize object-based data access between the host and the CXL memory module.

An embodiment of the present disclosure further provides a method for accessing data, which is applied to a CXL memory module. The CXL memory module includes a controller and a group of memory chips connected to the controller, the controller has a KV interface based on a CXL protocol, as shown in FIG. 3A. The method includes the following acts 100 and 105.

In act 100, a KV instruction sent by an external device is received through the KV interface.

In act 105, object-based data is stored in a memory chip or object-based data is acquired from a memory chip.

The method for accessing data may be implemented by a controller of the CXL memory module according to any one of the above embodiments. The method for accessing data may include a data putting process or a data getting process.

Figure 3B:
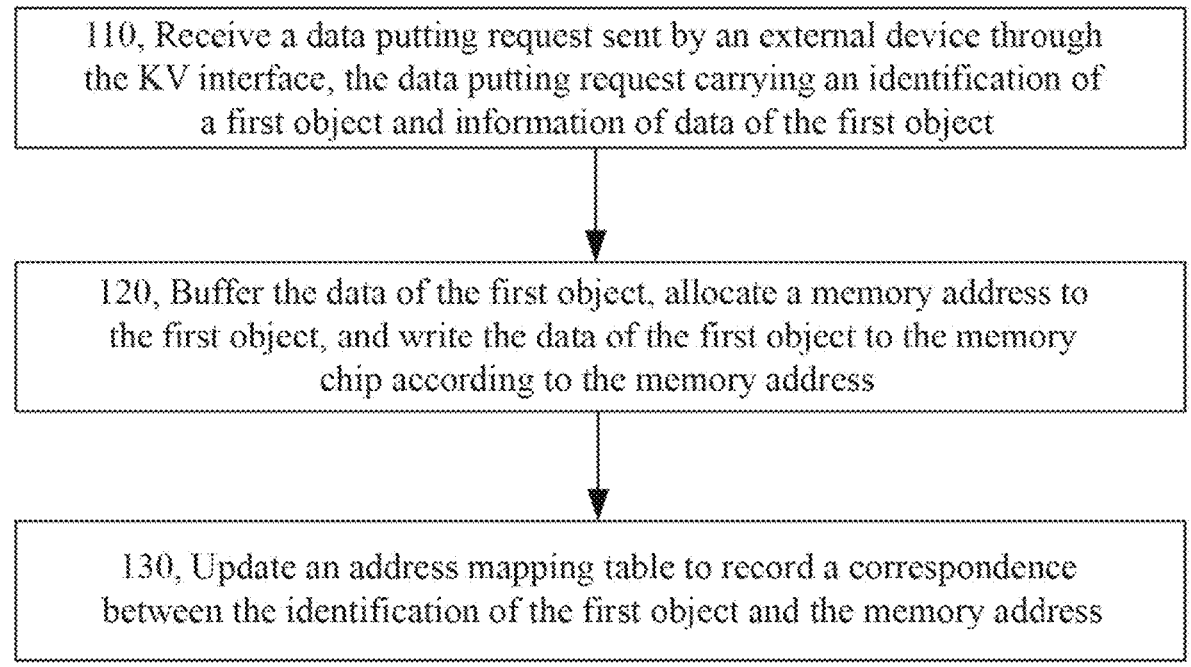
FIG. 3B is a flowchart of a data putting method according to an embodiment of the present disclosure.

In an exemplary embodiment of the present disclosure, as shown in FIG. 3B, a data putting process is provided. The acts of receiving the KV instruction sent by the external device through the KV interface and storing the object-based data in the memory chip include the following acts 110 to 130.

In act 110, a data putting request sent by an external device is received through the KV interface, the data putting request carries an identification of a first object and information of data of the first object.

In act 120, the data of the first object is buffered, a memory address is allocated to the first object, and the data of the first object is written to the memory chip according to the memory address.

In act 130, an address mapping table is updated to record a correspondence between the identification of the first object and the memory address.

The data putting process may be implemented by a controller in the CXL memory module.

According to the method of the present embodiment, the KV instruction sent by the external device is received through the KV interface. If a data putting request is received, data of the object is buffered and a memory address is allocated thereto. According to the memory address, the data of the object is stored in the memory chip, and a correspondence between the identification of the object and the memory address allocated to the object is recorded. In the present embodiment, according to the KV-based memory storage, the external device such as a host can access the CXL memory module to perform the object storage operations of unstructured data, and a size of data stored at one time is not limited by the data size of Cacheline, thereby reducing the storing times of the storage medium and improving the data storage efficiency.

In an exemplary embodiment of the present disclosure, the act of buffering the data of the first object includes: buffering original data of the first object in a first buffer zone. The method further includes: compressing the original data of the first object using the following multi-object compression mode when determining that the original data of the first object that has been buffered is data to be compressed: determining whether a total size of the buffered data to be compressed in the first buffer zone is greater than or equal to a set first threshold value; when the total size of the buffered data to be compressed is greater than or equal to the first threshold value, recording an offset of original data of each object in the buffered data to be compressed, compressing the buffered data to be compressed, and obtaining compressed data to be stored; and when the total size of the buffered data to be compressed is less than the first threshold value, and then the total size of the buffered data to be compressed is greater than or equal to the first threshold value due to adding of original data of a new object, recording an offset of the original data of each object in the buffered data to be compressed, compressing the buffered data to be compressed, and obtaining compressed data to be stored.

The method in the present embodiment may be implemented by a controller in the CXL memory module according to any one of the above embodiments.

In an exemplary embodiment of the present disclosure, when the original data of the first object is compressed in the multi-object compression mode, the acts of allocating the memory address to the first object, and writing the data of the first object to the memory chip according to the memory address include: striping the compressed data to be stored into a plurality of data blocks, the compressed data of the first object being located in at least one of the plurality of data blocks; allocating memory addresses of different banks in a same interleave region to different data blocks in the plurality of data blocks, and taking the memory addresses allocated to the plurality of data blocks as memory addresses uniformly allocated to all objects to which the compressed data to be stored belongs; and writing the plurality of data blocks to respective corresponding banks in an interleaving access mode according to the memory addresses allocated to the plurality of data blocks, wherein one interleave region includes one or more banks in a flash memory chip.

The method in the present embodiment may be implemented by a controller in the CXL memory module according to any one of the above embodiments.

In an example of the present embodiment, the first threshold value may be determined according to a size of the first buffer zone. The first threshold value may be not less than 4 KB, 8 KB, 16 KB, 32 KB, 64 KB, 128 KB, or 256 KB.

In an exemplary embodiment of the present disclosure, the buffered data to be compressed includes the original data of all objects that has been buffered, and the original data of all objects that has been buffered is directly determined as the data to be compressed. Alternatively, the buffered data to be compressed only includes the original data of a designated object that has been buffered, and the original data of the first object that has been buffered is determined as the data to be compressed only when the first object is a designated object. The designated object is an object whose original data has a data size greater than or equal to a set second threshold value, and the second threshold value is smaller than the first threshold value.

The method in the present embodiment may be implemented by a controller in the CXL memory module according to any one of the above embodiments.

In an exemplary embodiment of the present disclosure, the method further includes: allocating a memory address to the first object and writing the data of the first object to the memory chip according to the memory address in the following manner when the buffered data to be compressed only includes the original data of the designated object that has been buffered and the first object is not the designated object: not compressing the original data of the first object, directly allocating a memory address to the first object according to the original data of the first object, and writing the original data of the first object to the memory chip according to the allocated memory address; or, first determining whether a data size of the original data of the first object is greater than or equal to a set third threshold value, the third threshold value being smaller than the second threshold value; compressing the original data of the first object individually using a single object compression mode, allocating a memory address to the first object according to the compressed data of the first object, and writing the compressed data of the first object to the memory chip according to the allocated memory address when the data size of the original data of the first object is greater than or equal to the third threshold value; and not compressing the original data of the first object, allocating a memory address to the first object according to the original data of the first object, and writing the original data of the first object to the memory chip according to the allocated memory address when the data size of the original data of the first object is smaller than the third threshold value.

The method in the present embodiment may be implemented by a controller in the CXL memory module according to any one of the above embodiments.

In an exemplary embodiment of the present disclosure, information of the data of the first object may include a data size and a source address of the original data of the first object; and the act of buffering the data of the first object includes: parsing the data putting request to obtain the data size and the source address, and reading the original data of the first object from outside according to the data size and the source address and buffering the original data of the first object in a first buffer zone. Alternatively, information of the data of the first object includes original data of the first object; and the act of buffering the data of the first object includes: parsing the data putting request to obtain the original data of the first object, and buffering the original data of the first object in a first buffer zone.

Figure 4:
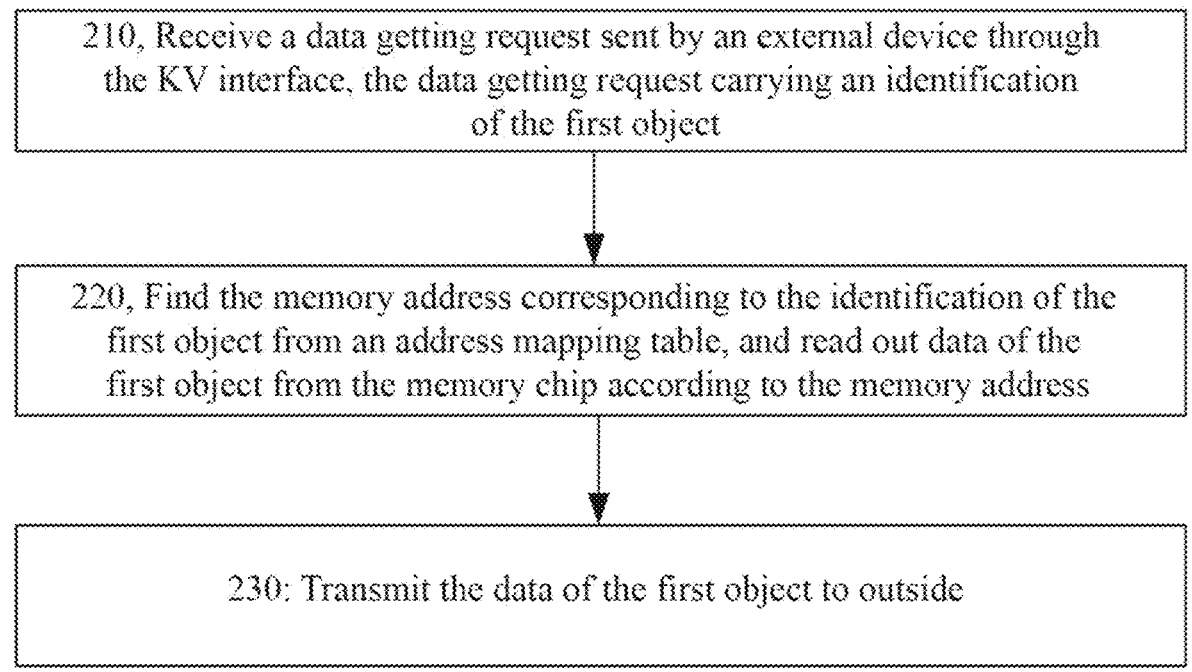
FIG. 4 is a flowchart of a data getting method according to an embodiment of the present disclosure.

In an exemplary embodiment of the present disclosure, as shown in FIG. 4, a data getting process is provided. The acts of receiving the KV instruction sent by the external device through the KV interface, and acquiring object-based data from the memory chip include the following acts 210 to 230.

In act 210, a data getting request sent by an external device is received through the KV interface, the data getting request carries an identification of a first object.

In act 220, the memory address corresponding to the identification of the first object is found from an address mapping table, and data of the first object is read out from the memory chip according to the memory address.

In act 230: the data of the first object is transmitted to outside.

The data getting process may be implemented by a controller in the CXL memory module according to any one of the above embodiments.

In an exemplary embodiment of the present disclosure, when the original data of the first object is compressed in a multi-object compression mode during storing data, the acts of finding the memory address corresponding to the identification of the first object from the address mapping table, reading out the data of the first object from the memory chip according to the memory address, and transmitting the data of the first object to outside include: searching an address mapping table according to the identification of the first object, and finding a memory address allocated to the first object, i.e., a memory address allocated to a plurality of data blocks into which the compressed data to be stored is striped, the compressed data of the first object being located in at least one of the data blocks; reading out the plurality of data blocks from the memory chip according to the memory address, splicing the plurality of data blocks into compressed data to be stored, decompressing the compressed data to be stored, obtaining buffered data to be compressed and buffering the buffered data to be compressed in a second buffer zone; and extracting the original data of the first object from the buffered data to be compressed according to a data size of the original data of the first object and an offset in the buffered data to be compressed, and transmitting part or all of the original data of the first object to outside.

The method in the present embodiment may be implemented by a controller in the CXL memory module according to any one of the above embodiments.

In an exemplary embodiment of the present disclosure, when the original data of the first object is not compressed during storing data, the acts of finding the memory address corresponding to the identification of the first object from the address mapping table, reading out the data of the first object from the memory chip according to the memory address, and transmitting the data of the first object to outside include: finding the memory address corresponding to the identification of the first object in a second buffer zone from the address mapping table, reading out the original data of the first object from the memory chip according to the found memory address, and buffering the original data of the first object in a second buffer zone; and transmitting part or all of the original data of the first object to outside.

The method in the present embodiment may be implemented by a controller in the CXL memory module according to any one of the above embodiments.

In an exemplary embodiment of the present disclosure, when the original data of the first object is compressed using a single object compression mode during storing data, the acts of finding the memory address corresponding to the identification of the first object from the address mapping table, reading out the data of the first object from the memory chip according to the memory address, and transmitting the data of the first object to outside include: finding the memory address corresponding to the identification of the first object from the address mapping table; reading out compressed data of the first object from the memory chip according to the found memory address and buffering in a second buffer zone; and decompressing the compressed data of the first object to obtain original data of the first object, and transmitting part or all of the original data of the first object to outside.

The method in the present embodiment may be implemented by a controller in the CXL memory module according to any one of the above embodiments.

In an exemplary embodiment of the present disclosure, the data getting request further carries data size information of the data to be acquired and offset information of the data to be acquired in the original data of the first object. The act of transmitting part of the original data of the first object to outside includes: extracting the data to be acquired from the original data of the first object according to the data size information and the offset information, and transmitting the data to be acquired to outside.

In an exemplary embodiment of the present disclosure, the act of transmitting part or all of the original data of the first object to outside includes: carrying the part or all of the original data of the first object in a data getting response and sending it to the external device. Alternatively, the data getting request further carries information of an external address for storing the data to be acquired, and the act of the controller transmitting part or all of the original data of the first object to outside includes: writing the part or all of the original data of the first object to a storage space corresponding to the external address.

The processing of the controller corresponding to the data putting process and the data getting process in the above embodiments of the present disclosure may refer to the above relevant embodiments of the controller.

Figure 5:
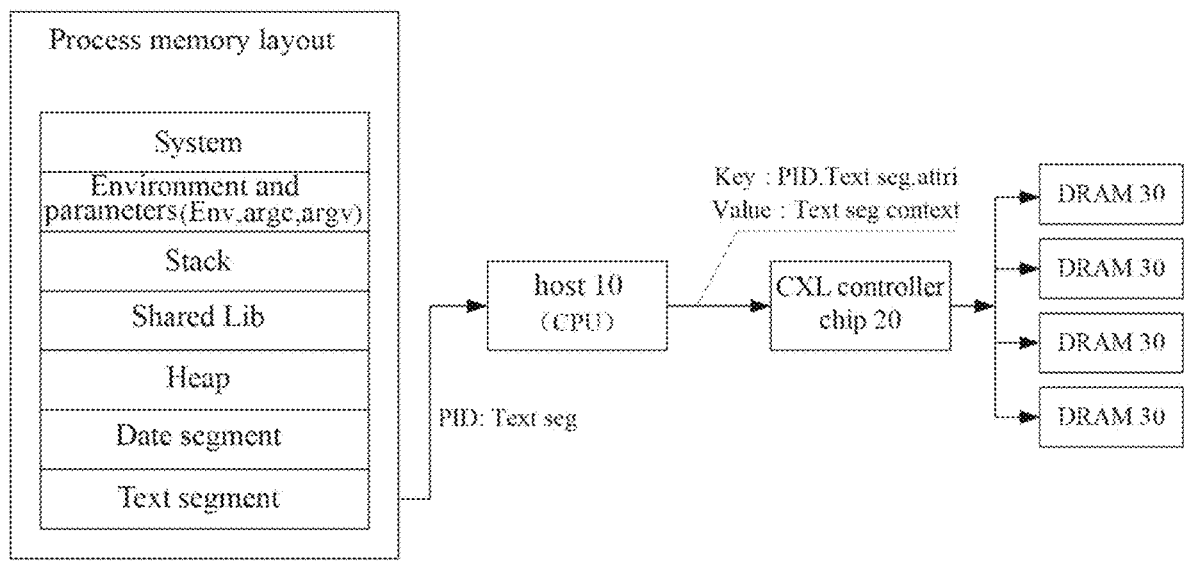
FIG. 5 is a schematic diagram of applying a method for implementing KV storing based on a CXL memory module to storage of process code segment according to an embodiment of the present disclosure.

FIG. 5 is an example of an embodiment of the present disclosure in a particular application, and is a possible implementation for a process. As shown in FIG. 5, the context included in the process includes the followings.

System represents a system, such as a kernel space of an operating system, including kernel codes and data structures of an operating system.

Env, argc, and argv represent information related to the process's running environment and command-line parameters.

Stack represents a stack for storing data such as context information, local variables, and function parameters called by a function.

Heap represents a heap, which is used for dynamic memory allocation. When a program needs to use a variable or object, a piece of memory with an appropriate data size may be applied from the heap, and is released back to the heap after use.

Shared Lib represents a shared library, also called as a dynamic link library, which is a code library that may be shared by multiple processes and includes common functions and data that are called by the multiple programs.

Text segment is also called as a read-only text segment, which is used to store executable codes of a program. Text segment is mapped into a memory when the program starts, and it is usually read-only to prevent the program from accidentally modifying its own code.

Date Segment is used to store global variables and static variables that have been initiated in a program. These variables are allocated to the data segment when the program starts, and are present throughout the running of the program.

Taking the Text segment as an example, context of each text segment is used as data (value) of an object and assigned with an object identification in this example. Then, it may be stored in the CXL memory module of an embodiment of the present disclosure, and may be got in a KV mode.

In the above process memory layout, the text segment is a resource that is frequently accessed. For example, for a large-scale application, the text segment occupies a larger memory space. If a link library is included, the space occupied will be even larger. The text segment is not modifiable after compilation, and therefore has read-only properties. Based on the above characteristics, the text segment of the process may be mapped to CXL memory in a KV mode according to the method of the above embodiment of the present disclosure. Storing in the KV mode can reduce the access times in the storage medium, improve the access efficiency, and can also improve the memory usage efficiency by compressing data.

As shown in the figure, the text segment serves as an object, and a Key of the object may be represented as: PID.Text seg. attri, where PID is a process identification; Text seg represents a text segment; and attri represents an attribute, such as read-only or read-write. Value is context of the text segment (Text seg context). The text segment of a process may serve as an object or be divided into multiple objects. In a case where the text segment is divided into multiple objects, corresponding index numbers may be added to the Key. A host 10 and a CXL controller 20 may interact through a KV instruction, according to the method of the above embodiment of the present disclosure, text segment data in the form of an object is stored to a DRAM chip 30, and the text segment data is read from the DRAM chip 30. Other context in the process shown in the figure may also be mapped to the CXL memory in the KV mode.

FIG. 6 is a module diagram of implementing KV storing based on a CXL memory module according to an embodiment of the present disclosure. As shown in the figure, a Host 50 includes a processor (such as a CPU) 51, a KV interpreter 53, a CXL storage protocol (CXL. mem) layer 55, and a CXL input-output (CXL. io) protocol layer 57. The host 50 side includes the KV interpreter 53, the CXL storage protocol layer 55, the CXL input and output protocol layer 57, and the processor 51.

The KV interpreter 53 is configured to extract a KV request encapsulated in a CXL.io instruction and parse the KV request, and encapsulate a KV response into the CXL.io instruction. The KV request includes a data putting request and a data getting request, and the KV response includes a data putting response and a data getting response.

The CXL storage protocol layer 55 is configured to transmit data. A KV instruction and object-based data may be transmitted between the host and the CXL memory module in the present embodiment, and other forms of data may also be transmitted therebetween.

The CXL input and output protocol layer 57 is located below the KV interpreter 53 and is configured to realize functions of device discovery, configuration, and data transmission of a CXL device (including a CXL memory module 60) during system initialization. It may also implement functions such as enumeration and IO control, for example, implement functions of transmitting data of an object and notifying the processor 51 or the CXL memory module 60 that the data of the object has been transmitted. The KV instruction is encapsulated in a CXL instruction as the data to be transmitted by the CXL instruction.

The processor 51 is configured to access the CXL memory module 60, send the KV instruction to the CXL memory module 60, and receive the KV instruction sent by the CXL memory module 60.

The CXL memory module 60 side includes a controller and a DRAM 69. The controller includes a KV interpreter 61, a CXL storage protocol layer 62, a CXL input and output protocol layer 63, a mapping table 65, a buffer 66, a compression engine 67, a data distributor 68, and a control module 64.

The KV interpreter 61 is configured to extract a KV request encapsulated in a CXL.io instruction and parse the KV request, and encapsulate a KV response into the CXL.io instruction. The KV request includes a data putting request and a data getting request, and the KV response includes a data putting response and a data getting response. The KV request and the KV response in the present disclosure are both KV instructions, and the KV instructions may be encapsulated in the CXL.io instruction as data to be transmitted.

The CXL storage protocol layer 62 is configured to transmit data.

The CXL input and output protocol layer 63 is located below the KV interpreter 61 and is configured to transmit a KV instruction and implement register control of the CXL memory module 60 and other functions.

The mapping table 65 is configured to record a mapping of data of an object to a physical memory resource (such as a memory address of a DRAM). The mapping table may include an address mapping table of the above embodiments, and may further record metadata of an object. The data of the mapping table 65 may be stored in a space reserved in the DRAM, or may be stored in the buffer 66.

The buffer 66 may be implemented using SRAM, and may be divided into a plurality of buffers. The buffer 66 is configured to buffer part or all of the data of the object during transmission. For example, it may buffer data to be written to the memory chip and data to be read from the memory chip. After the buffered data reaches a threshold, it is flushed to the DRAM.

The compression engine 67 is configured to implement transparent compression in the CXL memory module, including compression and decompression of data.

The data distributor 68 is configured to implement data distribution, such as striping compressed data to be stored and writing to the DRAM in an interleaving access mode.

The control module 64 is configured to control various modules in the controller to complete object-based data access. The figure only shows connection relationship between the control module 64 and some modules, and does not show connection relationship between the control module and the compression engine 67, and the data distributor 68.

In an embodiment of the present disclosure, by providing a KV interpreter above the CXL.io protocol layer, a KV interface based on a CXL protocol, or called KV API (Application Programming Interface) is constructed inside the host and the CXL controller. The KV interpreter of the present embodiment may encapsulate a KV instruction into a CXL.io instruction (or a CXL.mem instruction), or acquire a KV instruction from a CXL.io instruction (or a CXL.mem instruction), and may further parse the KV instruction to recognize an identification of an object, information of data of the object, and the like carried in the KV instruction.

As an exemplary implementation, the host 50 and the CXL memory module 60 may agree on the format of the KV instruction, such as object context transmission format and cut-off format.

The CXL memory module of the present embodiment may provide KV access instructions to an external device (such as a CPU). A hardware-accelerated compression/decompression storage mechanism may also be implemented inside the CXL controller to improve memory utilization and reduce access latency. Original data or compressed data of KV may also be stored to multiple DRAM chips in an interleaving mode inside the CXL controller to improve the system bandwidth. The above embodiment of the present disclosure may also expand to increase memory capacity using the CXL memory module.

After the KV interpreter is constructed based on the CXL.io protocol, when the CXL memory module receives a KV instruction for putting data (Put), all data (V value) of the object may be acquired according to the identification (Key value) of the object in the instruction and buffer the data in a buffer such as SRAM. After receiving a KV instruction for getting data (Get), the data of the object may be encapsulated in the CXL.io instruction between the host and the CXL memory module and transmitted to the host, thereby avoiding the full-path transmission of instruction data for each Cacheline between the host and the CXL memory module (mainly DRAM). By loading a large block of data for the identification of the object in the CXL memory module, multiple CXL.io control overheads are avoided. Between the CXL controller and the memory chip, an interleaving access mode may be used to realize the transmission of large data blocks, thereby improving the storage efficiency.

In the present embodiment, the KV instruction and an instruction of the CXL protocol (CXL instruction for short) are located on different levels. For example, when a host (such as a CPU) sends a KV instruction for putting data of an object (Put Object), encapsulation of the instruction may be first completed through the KV interpreter (this portion is transparent to the CXL layer); when the KV instruction is transmitted to the CXL.io protocol layer, the CXL.io protocol layer only treats it as a normal data transmission (no need to care about the specific content). In other words, the KV instruction is an application layer protocol formed above the CXL.io interface. Assumed that a KV instruction for putting data of an object (put object) is encapsulated, then seen from the CXL.io layer, it is several packets of data to be transmitted, after the CXL memory module receives the data, the KV interpreter is responsible for parsing the data. For the data of the object, the data itself (V value) may be encapsulated in a packet; or only an address of the data (V value) may be encapsulated, so that the CXL memory module may obtain the data of the object based on the address.

It may be understood by those of ordinary skills in the art that all or some acts in the above method, and function modules/units in the system and the apparatus in the disclosure may be implemented as software, firmware, hardware, or an appropriate combination thereof. In a hardware implementation, division of the function modules/units mentioned in the above description is not always corresponding to division of physical assemblies. For example, a physical assembly may have multiple functions, or a function or an act may be executed by several physical assemblies in cooperation. Some assemblies or all assemblies may be implemented as software executed by a processor such as a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those of ordinary skills in the art, a term computer storage medium includes volatile and nonvolatile, and removable and irremovable media implemented in any method or technology for storing information (for example, computer-readable instructions, a data structure, a program module, or other data). The computer storage medium includes, but is not limited to, RAM, ROM, EEPROM, a Flash RAM, or another memory technology, CD-ROM, a Digital Versatile Disk (DVD) or another optical disk storage, a magnetic box, a magnetic tape, magnetic disk storage or another magnetic storage apparatus, or any other medium that may be used for storing desired information and may be accessed by a computer. In addition, it is known to those of ordinary skills in the art that the communication medium usually includes computer-readable instructions, a data structure, a program module, or other data in a modulated data signal of, such as, a carrier or another transmission mechanism, and may include any information delivery medium.

From the foregoing, it will be appreciated that specific embodiments of the disclosure have been described herein for purposes of illustration, but that various modifications may be made without deviating from the scope of the disclosure. Accordingly, the disclosure is not limited except as by the appended claims.

What is claimed is:

1. A Compute Express Link (CXL) memory module, comprising a controller and a group of memory chips connected to the controller, wherein the controller has a KV (Key-Value pair) interface based on a CXL protocol, and is configured to receive a KV instruction sent by an external device through the KV interface, store object-based data into a memory chip or acquire object-based data from a memory chip;

wherein, the act of storing, by the controller, the object-based data into the memory chip comprises: acquiring original data of an object; compressing the original data of the object to obtain the compressed data of the object; and writing the compressed data of the object to the memory chip; and the act of acquiring, by the controller, the object-based data from the memory chip comprises: reading out compressed data of the object stored in the memory chip; and decompressing the compressed data of the object to obtain original data of the object and transmit the original data of the object to outside;

wherein:

the act of receiving, by the controller, the KV instruction sent by the external device through the KV interface, and storing, by the controller, the object-based data into the memory chip comprises:

receiving a data putting request sent by the external device through the KV interface, wherein the data putting request carries an identification of a first object and information of data of the first object;

buffering the data of the first object, allocating a memory address to the first object, and writing the data of the first object to the memory chip according to the memory address; and updating an address mapping table to record a correspondence between the identification of the first object and the memory address;

wherein:

the act of buffering, by the controller, the data of the first object comprises: buffering original data of the first object in a first buffer zone;

the controller is further configured to compress the original data of the first object using a following multi-object compression mode when determining that the original data of the first object that has been cached is data to be compressed:

determining whether a total size of the cached data to be compressed in the first buffer zone is greater than or equal to a set first threshold value;

when the total size of the buffered data to be compressed is greater than or equal to the first threshold value, recording an offset of original data of each object in the cached data to be compressed, compressing the buffered data to be compressed, and obtaining compressed data to be stored; and when the total size of the buffered data to be compressed is less than the first threshold value, and then due to adding of original data of a new object, the total size of the buffered data to be compressed is greater than or equal to the first threshold value, recording an offset of original data of each object in the buffered data to be compressed, compressing the buffered data to be compressed, and obtaining compressed data to be stored.

2. The CXL memory module according to claim 1, wherein:

the act of receiving, by the controller, the KV instruction sent by the external device through the KV interface, and acquiring, by the controller, the object-based data from the memory chip comprises:

receiving a data getting request sent by the external device through the KV interface, wherein the data getting request carries the identification of the first object; and finding the memory address corresponding to the identification of the first object from the address mapping table, and reading out the data of the first object from the memory chip according to the memory address; and transmitting the data of the first object to outside.

3. The CXL memory module according to claim 1, wherein:

when the original data of the first object is compressed in the multi-object compression mode, the act of allocating, by the controller, the memory address to the first object, and writing, by the controller, the data of the first object into the memory chip according to the memory address comprises:

striping the compressed data to be stored into a plurality of data blocks, wherein compressed data of the first object is located in at least one of the plurality of data blocks;

allocating memory addresses of different banks in a same interleave region to different data blocks in the plurality of data blocks, and taking the memory addresses allocated to the plurality of data blocks as memory addresses uniformly allocated to all objects to which the compressed data to be stored belongs; and writing the plurality of data blocks to respective corresponding banks in an interleaving access mode according to the memory addresses allocated to the plurality of data blocks;

wherein one interleave region comprises one or more banks in a memory chip.

4. The CXL memory module according to claim 3, wherein:

when the original data of the first object is compressed in the multi-object compression mode, the act of receiving, by the controller, the KV instruction sent by the external device through the KV interface, and acquiring, by the controller, the object-based data from the memory chip comprises:

receiving a data getting request sent by the external device through the KV interface, wherein the data getting request carries the identification of the first object;

searching the address mapping table according to the identification of the first object, and finding a memory address allocated to a plurality of data blocks into which the compressed data to be stored is striped;

reading out the plurality of data blocks from the memory chip according to the memory address, splicing the plurality of data blocks into the compressed data to be stored, decompressing the compressed data to be stored, obtaining the buffered data to be compressed and buffering the buffered data to be compressed in a second buffer zone; and extracting the original data of the first object from the buffered data to be compressed according to a data size of the original data of the first object and an offset of the original data of the first object in the buffered data to be compressed, and transmitting part or all of the original data of the first object to outside.

5. The CXL memory module according to claim 4, wherein:

the data getting request further carries data size information of data to be acquired and offset information of the data to be acquired in the original data of the first object; and the act of transmitting, by the controller, part of the original data of the first object to outside comprises: extracting the data to be acquired from the original data of the first object according to the data size information and the offset information, and transmitting the data to be acquired to outside.

6. The CXL memory module according to claim 4, wherein:

the act of transmitting, by the controller, part or all of the original data of the first object to outside comprises:

carrying the part or all of the original data of the first object in a data getting response and sending to the external device; or the data getting request further carries information of an external address for storing data to be acquired, and the act of transmitting, by the controller, part or all of the original data of the first object to outside comprises: writing the part or all of the original data of the first object to a storage space corresponding to the external address.

7. The CXL memory module according to claim 1, wherein:

the first threshold value is determined according to a size of the first buffer zone, and the first threshold value is not less than 4 KB, 8 KB, 16 KB, 32 KB, 64 KB, 128 KB or 256 KB.

8. The CXL memory module according to claim 1, wherein:

the buffered data to be compressed comprises original data of all objects that have been buffered, and the controller directly determines the original data of the first object that has been buffered as the data to be compressed; or the buffered data to be compressed only comprises original data of a designated object that has been buffered, and the controller determines the original data of the first object that has been buffered as the data to be compressed only when the first object is the designated object, wherein the designated object is an object whose original data has a data size greater than or equal to a set second threshold value, and the second threshold value is smaller than the first threshold value.

9. The CXL memory module according to claim 8, wherein:

the controller is further configured to allocate a memory address to the first object and write the data of the first object to the memory chip according to the memory address in a following mode when the buffered data to be compressed only comprises the original data of the designated object that has been buffered and the first object is not the designated object:

directly allocating a memory address to the first object according to the original data of the first object without compressing the original data of the first object, and writing the original data of the first object to the memory chip according to the allocated memory address, or first determining whether a data size of the original data of the first object is greater than or equal to a set third threshold value, wherein the third threshold value is smaller than the second threshold value; when the data size of the original data of the first object is greater than or equal to the third threshold value, compressing the original data of the first object individually using a single object compression mode, allocating a memory address to the first object according to the compressed data of the first object, and writing the compressed data of the first object to the memory chip according to the allocated memory address; and when the data size of the original data of the first object is smaller than the third threshold value, not compressing the original data of the first object, allocating a memory address to the first object according to the original data of the first object, and writing the original data of the first object to the memory chip according to the allocated memory address.

10. The CXL memory module according to claim 9, wherein:

when the original data of the first object is not compressed, the acting of receiving, by the controller, the KV instruction sent by the external device through the KV interface, and acquiring, by the controller, the object-based data from the memory chip comprises:

receiving a data getting request sent by the external device through the KV interface, wherein the data getting request carries the identification of the first object;

finding a memory address corresponding to the identification of the first object from the address mapping table, reading out the original data of the first object from the memory chip according to the found memory address, and buffering the original data of the first object in a second buffer zone; and transmitting part or all of the original data of the first object to outside;

or when the original data of the first object is compressed in the single object compression mode, the act of receiving, by the controller, the KV instruction sent by the external device through the KV interface, and acquiring, by the controller, the object-based data from the memory chip comprises:

receiving a data getting request sent by the external device through the KV interface, wherein the data getting request carries the identification of the first object;

finding a memory address corresponding to the identification of the first object from the address mapping table, reading out compressed data of the first object from the memory chip according to the found memory address, and buffering the compressed data of the first object in a second buffer zone; and decompressing the compressed data of the first object to obtain the original data of the first object, and transmitting part or all of the original data of the first object to outside.

11. The CXL memory module according to claim 1, wherein:

the information of the data of the first object comprises a data size and a source address of original data of the first object; and the act of buffering, by the controller, the data of the first object comprises: parsing the data putting request to obtain the data size and the source address, and reading the original data of the first object from outside according to the data size and the source address, and buffering the original data of the first object in a first buffer zone; or the information of the data of the first object comprises original data of the first object; and the act of buffering, by the controller, the data of the first object comprises: parsing the data putting request to obtain the original data of the first object, and buffering the original data of the first object in a first buffer zone.

12. The CXL memory module according to claim 1, wherein:

the KV interface based on the CXL protocol is implemented by a KV interpreter constructed above a CXL.io protocol layer and/or a CXL.mem protocol layer, and the KV interpreter is configured to extract and parse a KV request encapsulated in a CXL.io instruction or a CXL.mem instruction as data to be transmitted; and encapsulate a KV response into a CXL.io instruction or a CXL.mem instruction as data to be transmitted; wherein the KV request comprises a data putting request and a data getting request, and the KV response comprises a data putting response and a data getting response.

13. A storage system, comprising a host, and a CXL memory module according to claim 1, wherein the host communicates with the CXL memory module through a CXL interface to implement discovery, configuration and data transmission to the CXL memory module, and communicates with the CXL memory module through a KV interface constructed based on a CXL protocol to implement object-based data access between the host and the CXL memory module.

14. A controller in a Compute Express Link (CXL) memory module, comprising a processor, a buffer, a CXL interface, and a memory interface, wherein a KV (key-value pair) interface based on a CXL protocol is constructed above the CXL interface, and the processor is configured to perform the following data putting operations:
receiving a data putting request sent by an external device through the KV interface, wherein the data putting request carries an identification of a first object and information of data of the first object;
buffering the data of the first object in the buffer, allocating a memory address to the first object, and writing the data of the first object to a memory chip connected to the memory interface according to the memory address; and
updating an address mapping table to record a correspondence between the identification of the first object and the memory address;
wherein the act of buffering, by the processor, the data of the first object comprises: buffering the original data of the first object in a first buffer zone of the buffer; and
the controller further comprises a compression engine, and is further configured to compress the original data of the first object using the compression engine in a following multi-object compression mode when determining that the original data of the first object that has been buffered is data to be compressed: determining whether a total size of buffered data to be compressed in the first buffer zone is greater than or equal to a set first threshold value; when the total size of the buffered data to be compressed is greater than or equal to the first threshold value, recording an offset of original data of each object in the buffered data to be compressed, compressing the buffered data to be compressed, and obtaining compressed data to be stored; and when the total size of the buffered data to be compressed is less than the first threshold value, and then due to adding of original data of a new object, the total size of the buffered data to be compressed is greater than or equal to the first threshold value, recording an offset of original data of each object in the buffered data to be compressed, recording an offset of the original data of each object in the cached data to be compressed, compressing the cached data to be compressed, and obtaining compressed data to be stored.

15. The controller according to claim 14, wherein:
when the original data of the first object is compressed in the multi-object compression mode, the act of allocating, by the processor, the memory address to the first object, and storing, by the processor, the data of the first object to the memory chip connected to the memory interface according to the memory address comprises:
striping the compressed data to be stored into a plurality of data blocks, wherein the compressed data of the first object is located in at least one of the plurality of data blocks;
allocating memory addresses of different banks in a same interleave region to different data blocks in the plurality of data blocks, and taking the memory addresses allocated to the plurality of data blocks as memory addresses uniformly allocated to all objects to which the compressed data to be stored belongs; and
writing the plurality of data blocks to respective corresponding banks in an interleaving access mode according to the memory addresses allocated to the plurality of data blocks;
wherein one interleave region comprises one or more banks in a memory chip.

16. The controller according to claim 14, wherein:
the buffered data to be compressed comprises original data of all objects that have been buffered, and the processor directly determines the original data of the first object that has been buffered as the data to be compressed; or
the buffered data to be compressed only comprises original data of a designated object that has been buffered, and the processor determines the original data of the first object that has been buffered as the data to be compressed only when the first object is the designated object, wherein the designated object is an object whose original data has a data size greater than or equal to a set second threshold value, and the second threshold value is smaller than the first threshold value.

17. The controller according to claim 16, wherein:
the processor is further configured to allocate a memory address to the first object and store the data of the first object to the memory chip connected to the memory interface according to the memory address in a following mode when the buffered data to be compressed only comprises the original data of the designated object that has been buffered and the first object is not the designated object:
directly allocating a memory address to the first object according to the original data of the first object without compressing the original data of the first object, and writing the original data of the first object to the memory chip according to the allocated memory address, or
first determining whether a data size of the original data of the first object is greater than or equal to a set third threshold value, wherein the third threshold value is smaller than the second threshold value; when the data size of the original data of the first object is greater than or equal to the third threshold value, compressing the original data of the first object individually using a single object compression mode, allocating a memory address to the first object according to the compressed data of the first object, and writing the compressed data of the first object to the memory chip according to the allocated memory address; and when the data size of the original data of the first object is smaller than the third threshold value, not compressing the original data of the first object, allocating a memory address to the first object according to the original data of the first object, and writing the original data of the first object to the memory chip according to the allocated memory address.

18. The controller according to claim 16, wherein:
when the original data of the first object is not compressed, the processor is further configured to perform the following data getting operations:
receiving a data getting request sent by the external device through the KV interface, wherein the data getting request carries an identification of the first object;
finding a memory address corresponding to the identification of the first object from the address mapping table, reading out the original data of the first object from the memory chip according to the found memory address, and buffering the original data of the first object in a second buffer zone; and
transmitting part or all of the original data of the first object to outside;
or
when the original data of the first object is compressed in the single object compression mode, the processor is further configured to perform the following data getting operations:
receiving a data getting request sent by the external device through the KV interface, wherein the data getting request carries the identification of the first object;
finding a memory address corresponding to the identification of the first object from the address mapping table, reading out compressed data of the first object from the memory chip according to the found memory address and buffering the compressed data of the first object in a second buffer zone; and
decompressing the compressed data of the first object to obtain the original data of the first object, and transmitting part or all of the original data of the first object to outside.

19. The controller according to claim 14, wherein:
when the original data of the first object is compressed in the multi-object compression mode, the processor is further configured to perform the following data getting operations:
receiving a data getting request sent by the external device through the KV interface, wherein the data getting request carries the identification of the first object;
searching the address mapping table according to the identification of the first object, and finding a memory address allocated to a plurality of data blocks into which the compressed data to be stored is striped;
reading out the plurality of data blocks from the memory chip according to the memory address, splicing the plurality of data blocks into the compressed data to be stored, decompressing the compressed data to be stored, obtaining the buffered data to be compressed and buffering the buffered data to be compressed in a second buffer zone; and
extracting the original data of the first object from the buffered data to be compressed according to a data size of the original data of the first object and an offset of the original data of the first object in the buffered data to be compressed, and transmitting part or all of the original data of the first object to outside.

20. A method for accessing data, which is applied to a Compute Express Link (CXL) memory module, wherein the CXL memory module comprises a controller and a group of memory chips connected to the controller, the controller has a KV (key-value pair) interface based on a CXL protocol, the method comprises: receiving a KV instruction sent by an external device through the KV interface, storing object-based data into a memory chip or acquiring object-based data from a memory chip;
wherein, the act of storing, by the controller, the object-based data into the memory chip comprises: acquiring original data of an object; compressing the original data of the object to obtain the compressed data of the object; and writing the compressed data of the object to the memory chip; and
the act of acquiring, by the controller, the object-based data from the memory chip comprises: reading out compressed data of the object stored in the memory chip; and decompressing the compressed data of the object to obtain original data of the object and transmit the original data of the object to outside; wherein:
receiving the KV instruction sent by the external device through the KV interface, and storing the object-based data into the memory chip comprises:
receiving a data putting request sent by the external device through the KV interface, wherein the data putting request carries an identification of a first object and information of data of the first object;
buffering the data of the first object, allocating a memory address to the first object, and writing the data of the first object to the memory chip according to the memory address; and
updating an address mapping table to record a correspondence between the identification of the first object and the memory address;
wherein:
buffering the data of the first object comprises: buffering original data of the first object in a first buffer zone; and
the method further comprises: compressing the original data of the first object using a following multi-object compression mode when determining that the original data of the first object that has been buffered is data to be compressed: determining whether a total size of the buffered data to be compressed in the first buffer zone is greater than or equal to a set first threshold value;
when the total size of the buffered data to be compressed is greater than or equal to the first threshold value, recording an offset of original data of each object in the buffered data to be compressed, compressing the buffered data to be compressed, and obtaining compressed data to be stored; and when the total size of the buffered data to be compressed is less than the first threshold value, and then due to adding of original data of a new object, the total size of the buffered data to be compressed is greater than or equal to the first threshold value, recording an offset of original data of each object in the buffered data to be compressed, compressing the buffered data to be compressed, and obtaining compressed data to be stored.

21. The method according to claim 20, wherein:
when the original data of the first object is compressed in the multi-object compression mode, allocating the memory address to the first object, and writing the data of the first object into the memory chip according to the memory address comprises:
striping the compressed data to be stored into a plurality of data blocks, wherein the compressed data of the first object is located in at least one of the plurality of data blocks;
allocating memory addresses of different banks in a same interleave region to different data blocks in the plurality of data blocks, and taking the memory addresses allocated to the plurality of data blocks as memory addresses uniformly allocated to all objects to which the compressed data to be stored belongs; and writing the plurality of data blocks to respective corresponding banks in an interleaving access mode according to the memory addresses allocated to the plurality of data blocks;
wherein one interleave region comprises one or more banks in a memory chip.

22. The method according to claim 20, wherein:
the buffered data to be compressed comprises original data of all objects that have been buffered, and the original data of the first object that has been buffered is directly determined as the data to be compressed; or
the buffered data to be compressed only comprises original data of a designated object that has been buffered, and the original data of the first object that has been buffered is determined as the data to be compressed only when the first object is the designated object, wherein the designated object is an object whose original data has a data size greater than or equal to a set second threshold value, and the second threshold value is smaller than the first threshold value.

23. The method according to claim 20, further comprising:
allocating a memory address to the first object and writing the data of the first object to the memory chip according to the memory address in a following mode when the buffered data to be compressed only comprises the original data of the designated object that has been buffered and the first object is not the designated object:
directly allocating a memory address to the first object according to the original data of the first object without compressing the original data of the first object, and writing the original data of the first object to the memory chip according to the allocated memory address, or
first determining whether a data size of the original data of the first object is greater than or equal to a set third threshold value, wherein the third threshold value is smaller than the second threshold value; when the data size of the original data of the first object is greater than or equal to the third threshold value, compressing the original data of the first object individually using a single object compression mode, allocating a memory address to the first object according to the compressed data of the first object, and writing the compressed data of the first object to the memory chip according to the allocated memory address; and when the data size of the original data of the first object is smaller than the third threshold value, not compressing the original data of the first object, allocating a memory address to the first object according to the original data of the first object, and writing the original data of the first object to the memory chip according to the allocated memory address.

24. The method according to claim 20, wherein:
receiving the KV instruction sent by the external device through the KV interface, and acquiring the object-based data from the memory chip comprises:
receiving a data getting request sent by the external device through the KV interface, wherein the data getting request carries the identification of the first object;
finding the memory address corresponding to the identification of the first object from the address mapping table, and reading out the data of the first object from the memory chip according to the memory address; and
transmitting the data of the first object to outside.

25. The method according to claim 24, wherein:
when the original data of the first object is compressed in a multi-object compression mode during storing data, finding the memory address corresponding to the identification of the first object from the address mapping table, reading out the data of the first object from the memory chip according to the memory address, and transmitting the data of the first object to outside comprises:
searching the address mapping table according to the identification of the first object, and finding the memory address allocated to the first object, i.e., a memory address allocated to a plurality of data blocks into which the compressed data to be stored is striped, wherein the compressed data of the first object is located in at least one of the data blocks;
reading out the plurality of data blocks from the memory chip according to the memory address, splicing the plurality of data blocks into the compressed data to be stored, decompressing the compressed data to be stored, obtaining the buffered data to be compressed and buffering the buffered data to be compressed in a second buffer zone; and
extracting the original data of the first object from the buffered data to be compressed according to a data size of the original data of the first object and an offset of the original data of the first object in the buffered data to be compressed, and transmitting part or all of the original data of the first object to outside.

26. The method according to claim 24, wherein:
when the original data of the first object is not compressed during storing data, finding the memory address corresponding to the identification of the first object from the address mapping table, reading out the data of the first object from the memory chip according to the memory address, and transmitting the data of the first object to outside comprises:
finding the memory address corresponding to the identification of the first object in a second buffer zone from the address mapping table, reading out the original data of the first object from the memory chip according to the found memory address, and buffering the original data of the first object in the second buffer zone; and
transmitting part or all of the original data of the first object to outside;
or
when the original data of the first object is compressed using a single object compression mode when data is stored, finding the memory address corresponding to the identification of the first object from the address mapping table, reading out the data of the first object from the memory chip according to the memory address, and transmitting the data of the first object to outside comprises:
finding the memory address corresponding to the identification of the first object from the address mapping table;
reading out compressed data of the first object from the memory chip according to the found memory address and buffering in a second buffer zone; and
decompressing the compressed data of the first object to obtain the original data of the first object, and transmitting part or all of the original data of the first object to outside.

* * * * *